(12) United States Patent
Sugaya et al.

(10) Patent No.: US 6,891,662 B2
(45) Date of Patent: May 10, 2005

(54) OPTICAL AMPLIFIER AND METHOD FOR AMPLIFYING WAVELENGTH MULTIPLEXED TRANSMISSION SIGNAL LIGHT

(75) Inventors: Yasushi Sugaya, Kawasaki (JP); Etsuko Hayashi, Yamato (JP); Terumi Chikama, Zama (JP); Sinya Inagaki, Shinjuku (JP); Norifumi Shukunami, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 10/013,839

(22) Filed: Dec. 13, 2001

(65) Prior Publication Data

US 2002/0093728 A1 Jul. 18, 2002

(30) Foreign Application Priority Data

Dec. 15, 2000 (JP) ...................................... 2000-382711

(51) Int. Cl.$^7$ ................................................ H01S 3/00
(52) U.S. Cl. ..................................... 359/337.4; 359/349
(58) Field of Search ............................. 359/337.4, 349, 359/341.1

(56) References Cited

U.S. PATENT DOCUMENTS 6,104,527 A * 8/2000 Yang ..................... 359/341.33
6,134,047 A * 10/2000 Flood et al. ............ 359/337.12
6,304,370 B1 * 10/2001 Barnard ................... 359/341.1
6,317,254 B1 * 11/2001 Park et al. .............. 359/337.13
6,381,063 B1 * 4/2002 Liu ............................. 359/337

FOREIGN PATENT DOCUMENTS

JP         2001044551 A  *  2/2001     ............. H01S/3/17

OTHER PUBLICATIONS

Karasek, M. Gain Enhancement in Gain–Shifted Erbium–Doped Fiber Amplifiers for WDM Applications. IEEE Photonics Technology Letters, vol. 11, No. 9, Sep. 1999. pp. 1111–1113.*

Hwang et al. Comparative high power conversion efficiency of C–plus L–band EDFA. Electronics Letters. Dec. 6th, 2001. vol. 37. No. 25. pp. 1539–1541.*

Becker et al. Erbium–Doped Fiber Amplifiers Fundamentals and Technology. Academic Press. 1999. pp. 268–277.*

* cited by examiner

*Primary Examiner*—Nelson Moskowitz
*Assistant Examiner*—Deandra M. Hughes
(74) *Attorney, Agent, or Firm*—Staas & Halsey LLP

(57) ABSTRACT

A rare earth element doped fiber forming an optical amplifier is pumped with a plurality of pumping lights to prevent drop of the inversion population ratio in the length direction of the rare earth element doped fiber.

28 Claims, 17 Drawing Sheets

BASIC STRUCTURE OF EDFA FOR L-BAND OPTICAL AMPLIFICATION

DISTRIBUTION IN THE LONGITUDINAL DIRECTION OF EDF OF THE INVERSION RATIO

POWER DISTRIBUTION IN THE LONGITUDINAL DIRECTION OF EACH CHANNEL OF 80-CHANNEL WAVELENGTH MULTIPLEXING

OPTICAL AMPLIFIER AND METHOD FOR AMPLIFYING WAVELENGTH MULTIPLEXED TRANSMISSION SIGNAL LIGHT

CROSS-REFERENCE TO RELATED APPLICATIONS

This application is based on, and claims priority to, Japanese Application No. 2000-382711, filed on Dec. 15, 2000, in Japan, and which is incorporated by reference.

BACKGROUND OF THE INVENTION

1. Field of the Invention

The present invention relates to an optical fiber amplifier to be applied to realize larger transmission capacity and longer distance transmission of a WDM transmission system.

2. Description of the Related Art

In recent years, with rapid progress of Internet technology, the demand for information has increased drastically, and further improvement in capacity and formation of a more flexible network are requested in the main line optical transmission system to which information capacity is concentrated.

The wavelength multiplexed (WDM) transmission system is the most effective system at present for such system demand, and it is now being investigated for commercial use mainly in the USA.

An amplifier for amplifying light using a rare earth element doped optical fiber, for example, an Er-doped fiber optical amplifier (Erbium-doped fiber amplifier: EDFA) is a key component to realize the wavelength multiplexed optical transmission system because it can amplify the waveform multiplexed light signals using its wider gain bandwidth.

It is known that EDFA can cover not only the amplifying bandwidth (1530 to 1565 nm), called the conventional band (C-band), which has mainly been used, but also the amplifying bandwidth (1570 to 1605 nm), which in recent years has been called the long wavelength band (L-band).

In the current EDFA system, it is possible to realize wavelength multiplexed amplification of about 200 wavelengths within the band combining the C-band and L-band.

In the EDFA system, it is required to select the inversion population ratio that provides the condition of the gain for each wavelength multiplexed signal light such that this gain becomes constant in each application wavelength band.

FIG. 1 illustrates the dependence on wavelength of the gain coefficient of a unit length of Er-doped fiber (EDF) when the inversion population ratio is changed. The lowest gain characteristic in the figure indicates the non-inverted distribution condition (inversion population ratio=0), while the highest gain characteristic indicates the condition (inversion population ratio 1) of complete inverted distribution (pumped to upper level). The intermediate characteristics indicate the condition where the inversion population ratio is increased in increments of 0.1.

FIG. 1 suggests: (1) the C-band EDFA operates at a wavelength near the center wavelength (1530 nm) for radiation/absorption of Er ions and can obtain sufficient gain using a short EDF (Er-doped fiber); and (2) the L-band EDFA has a small gain coefficient per unit length and requires a long-length EDF in comparison with the C-band EDFA.

FIG. 2 illustrates a basic structure of EDFA for L-band optical amplification. FIG. 2 includes EDF 1, optical isolators 2-1 and 2-2, a wavelength multiplex coupler (WDM coupler) 3, and a semiconductor laser 4 to pump laser light.

The wavelength multiplexed signal light supplied from the transmission path is supplied to the EDF 1 via optical isolator 2-1 and WDM coupler 3. The EDF 1 supplies almost identical gain to the L-band signal light as the C-Band and is therefore required to have a long length to attain the gain identical to that of the signal light of the C-band. The output of the EDF1 is provided via the optical isolator 2-2.

However, in a the gain-shift type optical amplifier such as the L-band EDFA, in which a low inversion population ratio is necessary to obtain the flat gain for the target amplifying wavelength band, and a rare earth element doped fiber is required to have a long-length to obtain the necessary gain, it is difficult to realize stable and efficient amplification.

SUMMARY OF THE INVENTION

Accordingly, it is an object of the present invention to provide an optical amplifier with a first rare earth element doped fiber receiving and optically amplifying an input transmission signal light with a first pumping light, and a second rare earth element doped fiber amplifying an output transmission signal light of the first rare earth element doped fiber with a second pumping light such that the level drop of each wavelength by an increase or decrease of the wavelength multiplexed signal is prevented.

Additional objects and advantages of the invention will be set forth in part in the description which follows and, in part, will be obvious from the description, or may be learned by practice of the invention.

The foregoing and other objects of the present invention are achieved by providing an optical fiber comprising a wavelength band portion dividing a transmission input light into a plurality of wavelength bandwidths, a first rare earth element doped fiber having optical amplifiers respectively provided to each wavelength bandwidth divided by the wavelength band portion, at least one optical amplifier among the optical amplifiers receiving the transmission input light and a first pumping light and amplifying these received lights, and a second rare earth element doped fiber receiving and amplifying an output of the first rare earth element doped fiber and a second pumping light.

The foregoing and other objects of the present invention may also be achieved by providing an optical amplifier amplifying an optical signal in a rare earth element doped fiber using a first pumping light with a forward pumping method.

In the case where a first wavelength output light power is amplified by inputting only the light of the first wavelength under the condition in which the first pumping light is constant, the lights of the first and second wavelengths are inputted to the rare earth element doped fiber for amplification, the second pumping light is pumped with the forward pumping method for the rare earth element doped fiber at the position where deviation of the first wavelength light power takes a positive value.

The foregoing and other objects of the present invention may also be achieved by providing an optical amplifier with a first rare earth element doped fiber amplifying an input light with a first pumping light and a second rare earth element doped fiber amplifying an output of the first rare earth element doped fiber with a second pumping light, such that when the transmission signal light of a particular wavelength is attenuated or disappears, the output transmission signal light power of another wavelength is set to a power almost identical to or higher than the power of the attenuated/disappearing wavelength before the transmission signal light of that wavelength disappears.

An optical amplifier is provided with a first rare earth element doped fiber amplifying an input light with a first pumping light and a second rare earth element doped fiber amplifying an output of the first rare earth element doped fiber with a second pumping light and the length of the first rare earth element doped fiber is set when the transmission signal light of a particular wavelength is attenuated or disappears so that the output transmission signal light power of another wavelength becomes identical to or higher than the output transmission signal light power of the attenuated/disappearing wavelength before the transmission signal light of that wavelength is attenuated or disappears.

The foregoing and other objects of the present invention may further be achieved by providing that the first pumping light in the optical amplifier is pumped with the forward pumping method for the rare earth element doped fiber.

The foregoing and other objects of the present invention may further be achieved by providing that the second pumping light in the optical amplifier is pumped with the forward pumping method for the rare earth element doped fiber.

The foregoing and other objects of the present invention may further be achieved by providing that the first pumping light and the second pumping light are branched from one pumping light source.

It is another object of the present invention to provide an optical amplifier with a first rare earth element doped fiber amplifying an input light with a first pumping light and a second rare earth element doped fiber amplifying an output of the first rare earth element doped fiber with a second pumping light such that the level drop of each wavelength due to increase or decrease of the wavelength multiplexed signal is prevented and the system structure is simplified with common use of a pumping light source.

The foregoing and other objects of the present invention may also be achieved by providing an optical amplifier with a wavelength bandwidth portion dividing an input light into a plurality of wavelength bandwidths and optical amplifiers for each wavelength bandwidth divided with the wavelength bandwidth portion. At least one optical amplifier among the optical amplifiers has a structure to realize forward pumping for the rare earth element doped fiber such that when the input transmission signal light of a particular wavelength is attenuated or disappears, the output transmission signal light power of another wavelength becomes identical to or higher than the output transmission signal light power of the attenuated/disappearing wavelength before that transmission signal light disappears.

The foregoing and other objects of the present invention may also be achieved by providing an optical amplifier with a wavelength bandwidth portion dividing an input light into a plurality of wavelength bandwidths and optical amplifiers for each wavelength bandwidth divided with the wavelength bandwidth portion, at least one optical amplifier among the optical amplifiers have a structure to realize the forward pumping for the rare earth element doped fiber, the length of the rare earth element doped fiber being set so that when the input transmission signal light of a particular wavelength is attenuated or disappears, the output transmission signal light power of another wavelength becomes identical to or higher than the output transmission signal light power of the attenuated/disappearing wavelength before that transmission signal light disappears.

The foregoing and other objects of the present invention may also be achieved by providing an optical amplifying method of amplifying a wavelength multiplexed transmission signal light such that a rare earth element doped fiber amplifying the wavelength multiplex transmission signal light with first and second pumping lights is provided to pump the first pumping light in the same direction as the transmitting direction of the input light, to pump the second pumping light in the direction opposite to the transmitting direction of the input light so that when the transmission signal light of a particular wavelength is attenuated or disappears in the output side of the rare earth element doped fiber, the output transmission signal light power of another wavelength becomes identical to or higher than the output transmission signal light power of the particular wavelength before it disappears.

As a method for amplifying the wavelength multiplex transmission signal light, the wavelength multiplex transmission signal light and the first pumping light are inputted to the first rare earth element doped fiber, an output of the first rare earth element doped fiber and the second pumping light are inputted to the second rare earth element doped fiber. Thereby, when the transmission signal light of the particular wavelength is attenuated or disappears, the transmission signal light power of the other wavelength becomes identical to or higher than the transmission signal light of the other wavelength before the transmission signal light of the particular wavelength disappears.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE INVENTION

Figure 1:
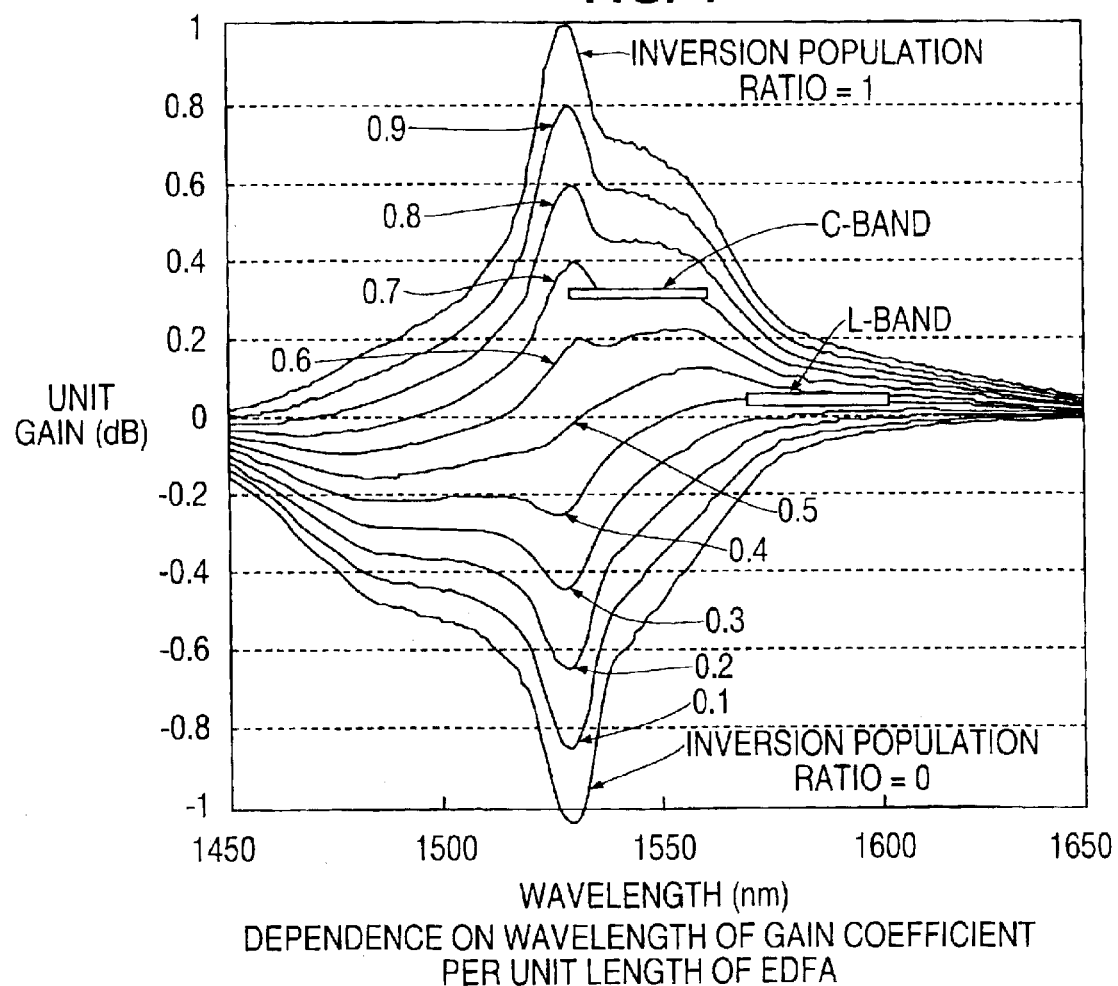
FIG. 1 is a graph illustrating the dependence on wavelength of gain coefficient per unit length of EDFA.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The wavelength multiplexed signal is here investigated from various viewpoints for a gain shift type optical amplifier, such as an L-band EDFA, which is required to have a lower inversion population ratio to attain the flat gain for the target amplifying wavelength bandwidth and to use a long-length rare earth element doped fiber for the necessary gain.

FIG. 1 is a graph illustrating the dependence of gain coefficient per unit length of EDFA. The length of the EDF must be set longer than that of the C-band EDFA in order to attain the same gain as that of C-band in the wavelength bandwidth of the L-band.

Figure 3:
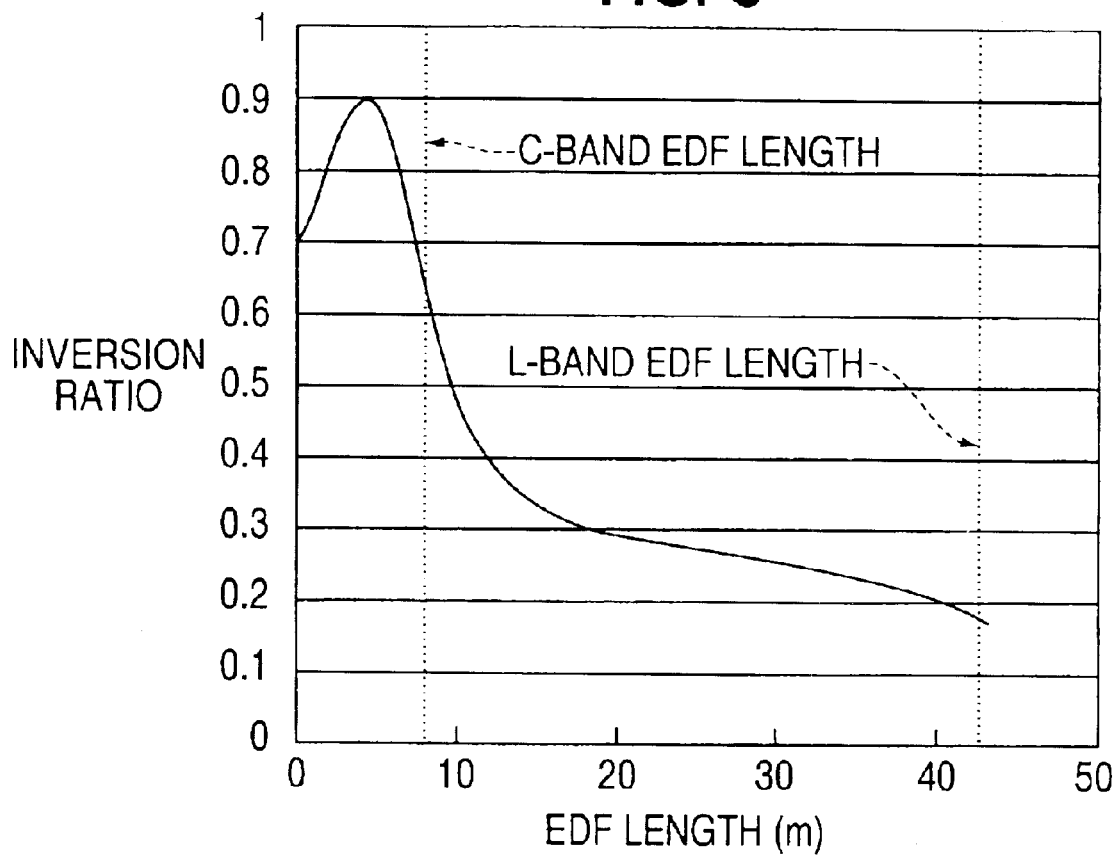
FIG. 3 is a graph illustrating the distribution of inversion ratio in the longitudinal direction of EDFA.

A simulation result of the inversion population ratio for the length direction when forward pumping is conducted for EDF in a constant pumping light source power, is illustrated in FIG. 3.

The following two points can be realized from the graph of FIG. 3. First, with regard to the inversion population ratio of an Er ion of the EDF length required for L-band EDFA, this value at the point near the output of the EDF is rather low because the EDF length becomes longer. Therefore, the pumping light power is not sufficiently distributed to the output of the EDF. Second, the inversion population ratio of the Er ion in the EDF length required for the C-band EDFA is high for the entire part of the EDF because the EDF length is short, therefore allowing the pumping light power to be sufficiently distributed to the output of the EDF.

Figure 4:
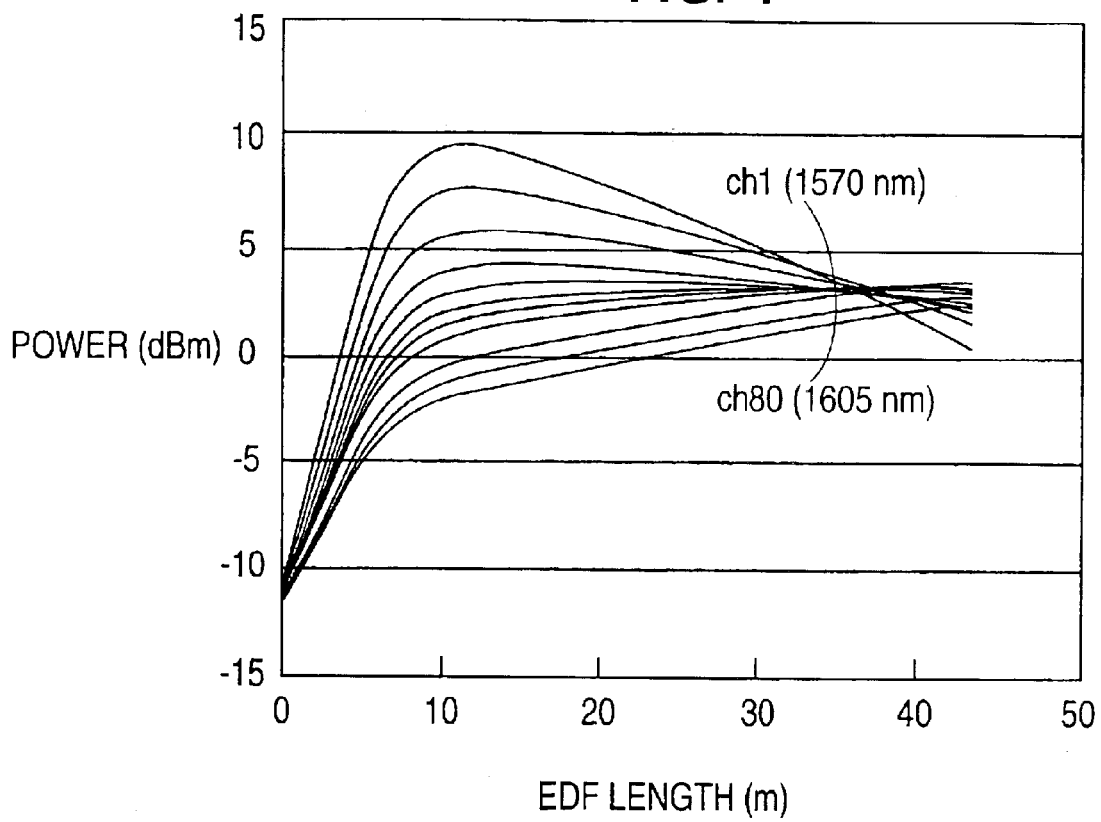
FIG. 4 is a graph illustrating the power distribution in the longitudinal direction of each channel in the wavelength multiplexing of 80 channels.

FIG. 4 illustrates a simulation for the light power level output in the EDF length of each wavelength in such a case where input power of signal lights are equal and wavelength of the signal lights power are allocated in intervals of about 0.4 nm to obtain 80 wavelength multiplexed signals in the bandwidth from 1570 nm to 1605 nm.

The upper most characteristic curve in the figure indicates the power distribution of the signal light of channel 1 having a wavelength of 1570 nm. Internal curve indicates channel 8, 16, 24, 32, 40, 48, 56, 64, 72, respectively. The lowest characteristic curve indicates the signal light channel 80 having a wavelength of 1605 nm.

FIG. 4 illustrates that a large difference is generated during the distribution in the longitudinal direction of the light power among the signal light channels. More specifically, the L-band EDFA shows a tendency to obtain a large gain of the light power at the short wavelength side of the EDFA at the area near the input of the EDF and to reduce the power toward the output of the EDF after the power reaches the maximum value. On the other hand, the optical power at the longer wavelength side of the EDFA indicates the tendency to monotonous increase toward the output of the EDF from the light input of the EDF.

From FIG. 1 and FIG. 3, it can be understood that the wavelength characteristic of gain changes to a large extent with a change in the inversion population ratio of Er ion in the EDF. Therefore, with regard to the long-length EDF to be used for the L-band EDFA, it can be understood that the inversion population ratio becomes lower at the area near the output of the EDF as show in FIG. 3. The distribution of signal light power and wavelength characteristics in the longitudinal output direction of the EDF as shown in FIG. 4 indicates that the signal light at the shorter wavelength side at the area near the input of the EDF contributes, to a large extent, to optical amplification of the signal light power in the long wavelength side.

Figure 2:
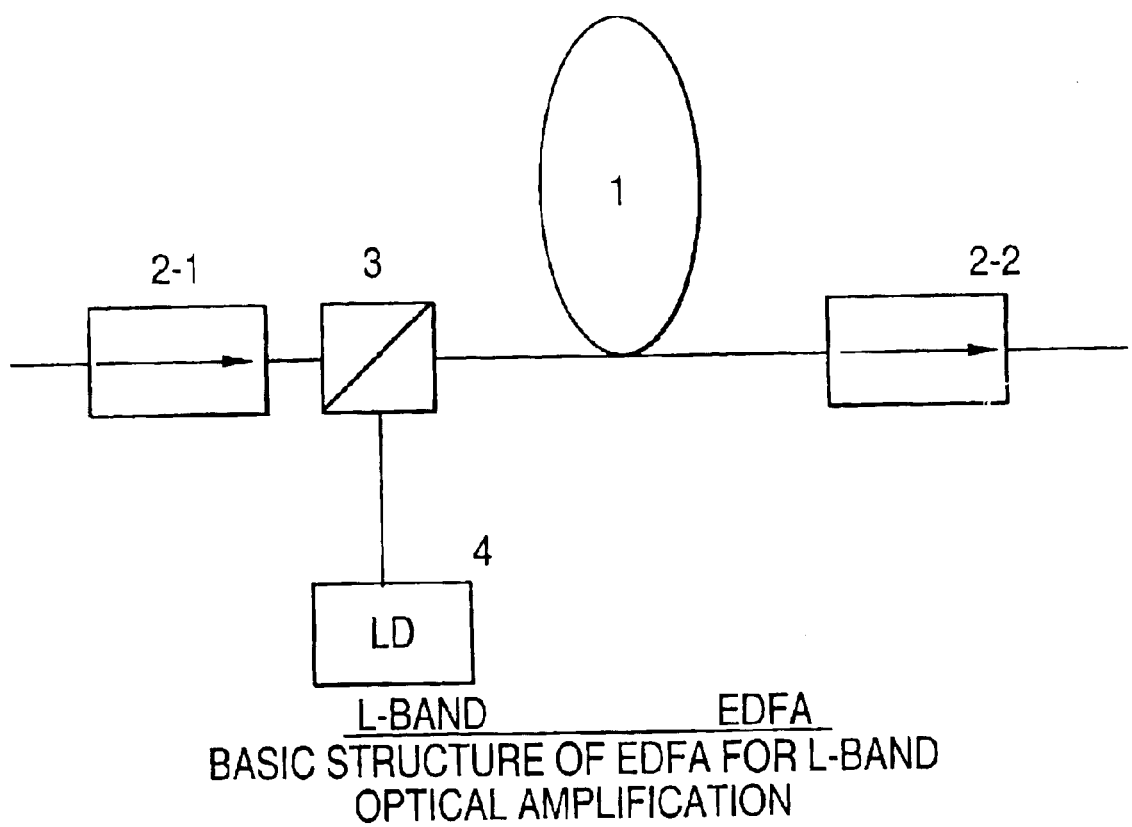
FIG. 2 is a diagram illustrating the basic structure of EDFA for optical amplification of L-band light.
Figure 5:
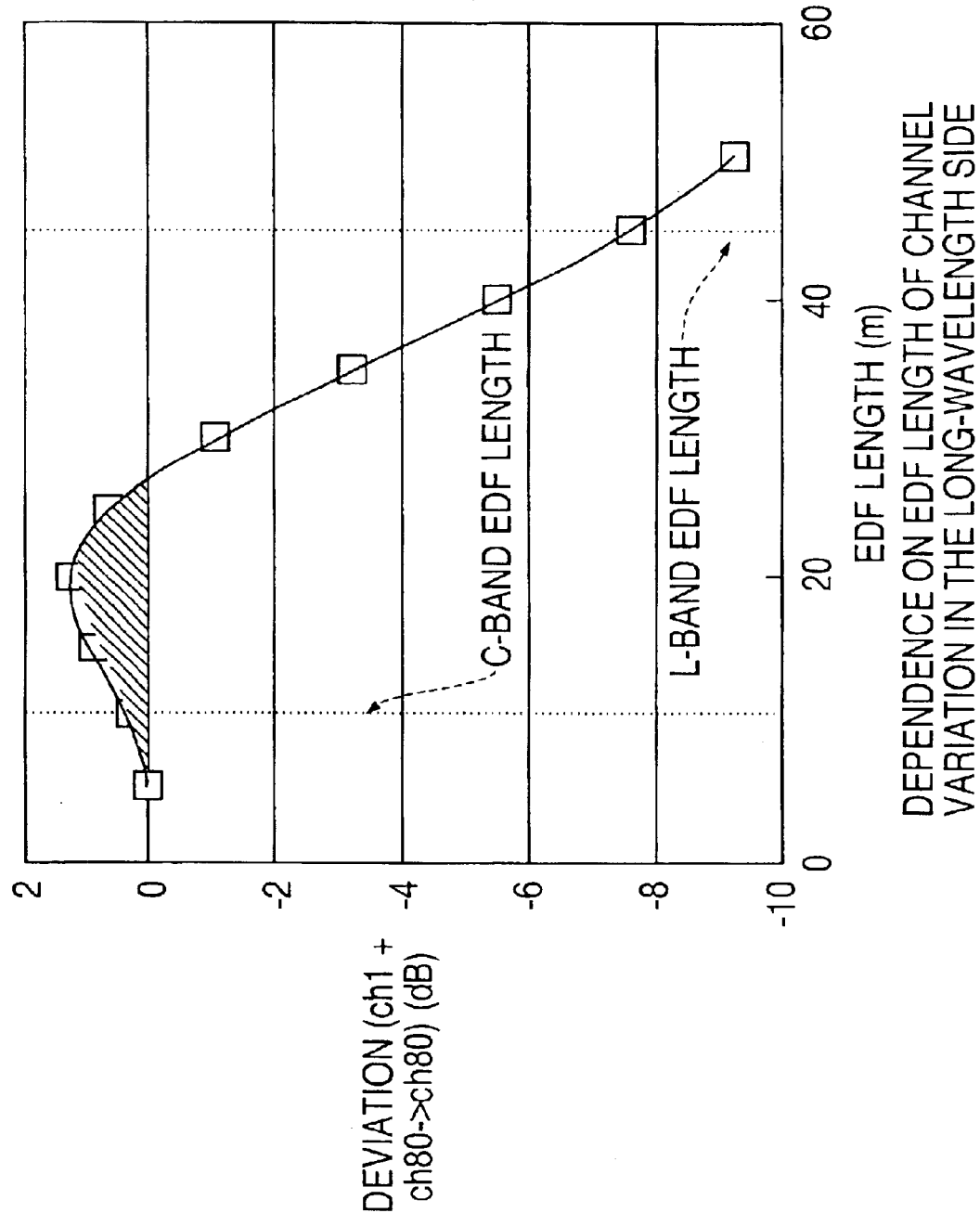
FIG. 5 is a graph illustrating the dependence on EDF length of power variation in the long wavelength side channel when shorter wavelength side channel is removed.

In the FIG. 5, the condition is assumed that the wavelength multiplexed signal light at the arbitrary channel among the 80 channels as indicated in FIG. 4 is amplified with the system structure illustrated in FIG. 2.

In this case, the phenomenon that the power of signal light at the longer wavelength side (for example, channel 80), when the signal light at the shorter wavelength side (for example, channel 1) is removed, becomes lower occurs in some cases when the output of the signal light at the longer wavelength side before the signal light at the shorter wavelength side is removed is compared with the output of the signal light channel in the longer wavelength side which is left after the signal light at the short wavelength side is removed. This occurs by inputting the signal lights of two wavelengths of the signal light at the shortest wavelength side and the light at the wavelength side longer than such shortest wavelength side under the condition that pumping light power is set to a constant value.

FIG. 5 illustrates the dependence of light power deviation output of the signal light of channel 80 on the length of the EDF which indicates the difference between the case when the signal light of channel 1 is inject and the case when such signal light of channel 1 is removed under the condition that the pumping light power is set constant while applying the system of FIG. 4 in the structure of FIG. 2

In the case where the EDF length is longer than the length when the deviation becomes negative, an output level of the transmission signal light of channel 80 decreases under the conditions explained above. This indicates that, in the EDF length required for amplifying the L-band light, an output level of the signal light of channel 80 is lowered when the signal light of channel 1 in the short wavelength side is removed under the conditions explained above. Meanwhile, in the EDF length of the C-band light, an output level of channel 80 is not lowered, but in fact is raised. This phenomenon can be explained from the relationship of the energy level of an Er ion within the EDF, and also from the results illustrated in FIGS. 1 and 3.

Figure 6:
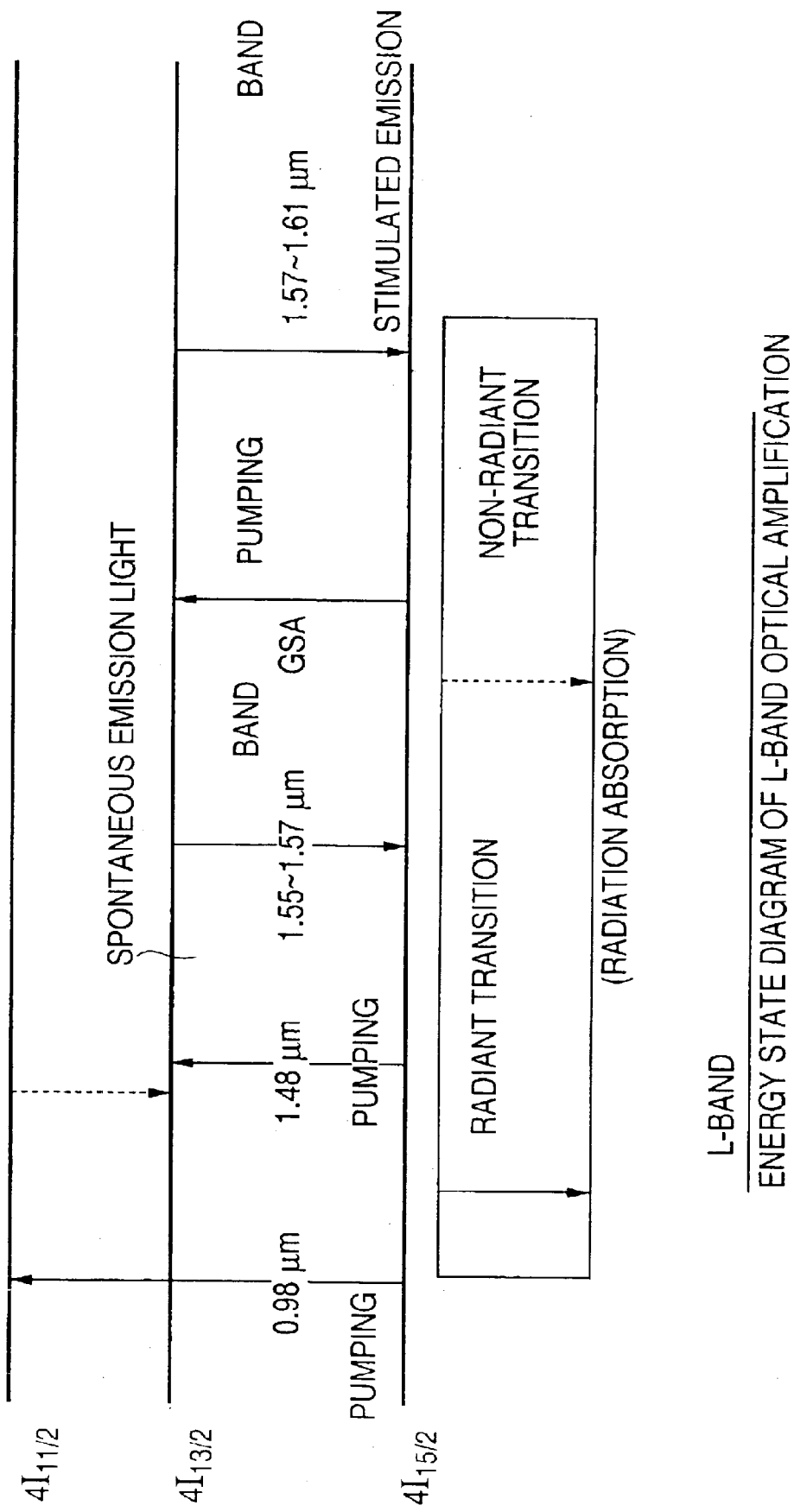
FIG. 6 is a diagram illustrating the energy state of L-band optical amplification.

FIG. 6 illustrates the energy level of the Er ion in the EDF for the L-band EDFA. In FIG. 6, the ions energy state transition from $^4I_{15/2}$ to $^4I_{13/2}$ with the pumping of 0.98 $\mu$m light, transition from $^4I_{15/2}$ to $^4I_{13/2}$ with the pumping of 1.48 $\mu$m light, from $^4I_{13/2}$ to $^4I^4I_{15/2}$ with spontaneous emission light generated in the 1.55 to 1.57 $\mu$m wavelength range, from $^4I_{15/2}$ to $^4I_{13/2}$ with the ground state absorption (GSA) and transition from $^4I_{13/2}$ to $^4I_{15/2}$ with the stimulated emission by the stimulated light (signal light of L-band) in the 1.55 to 1.61 µm wavelength range.

Referring back to the characteristic of FIG. 1, when the inversion population ratio becomes under 0.3, the gain coefficient (in dB) in the L-band becomes smaller than 0, which indicates that the absorption coefficient becomes larger than the gain coefficient, and the GSA in FIG. 6 becomes larger than the radiating transition (spontaneous emission light, stimulated emission light). This absorption coefficient tends to become large in the short wavelength side.

Referring back to FIG. 3, it can be seen that the inversion population ratio becomes under 0.3 at an EDF length exceeding about 20 m. Therefore, it may be thought that the signal light in the long wavelength side is amplified with GSA of the signal light in the short wavelength side at the area near the output of the EDF when exceeding the length of about 20 m of the EDF. In general, GSA of the signal light wavelength does not give influence on the optical amplification of the C-band which requires of the short length EDF, but it gives an influence on the optical amplification in the L-band at the area near the output of the long-length EDF, and thereby the absorption of a channel in the short wavelength side is intensified, as explained above. Therefore, the optical amplification for the L-band is primarily influenced with the existence or non-existence of the channel in the short wavelength side.

Figure 7:
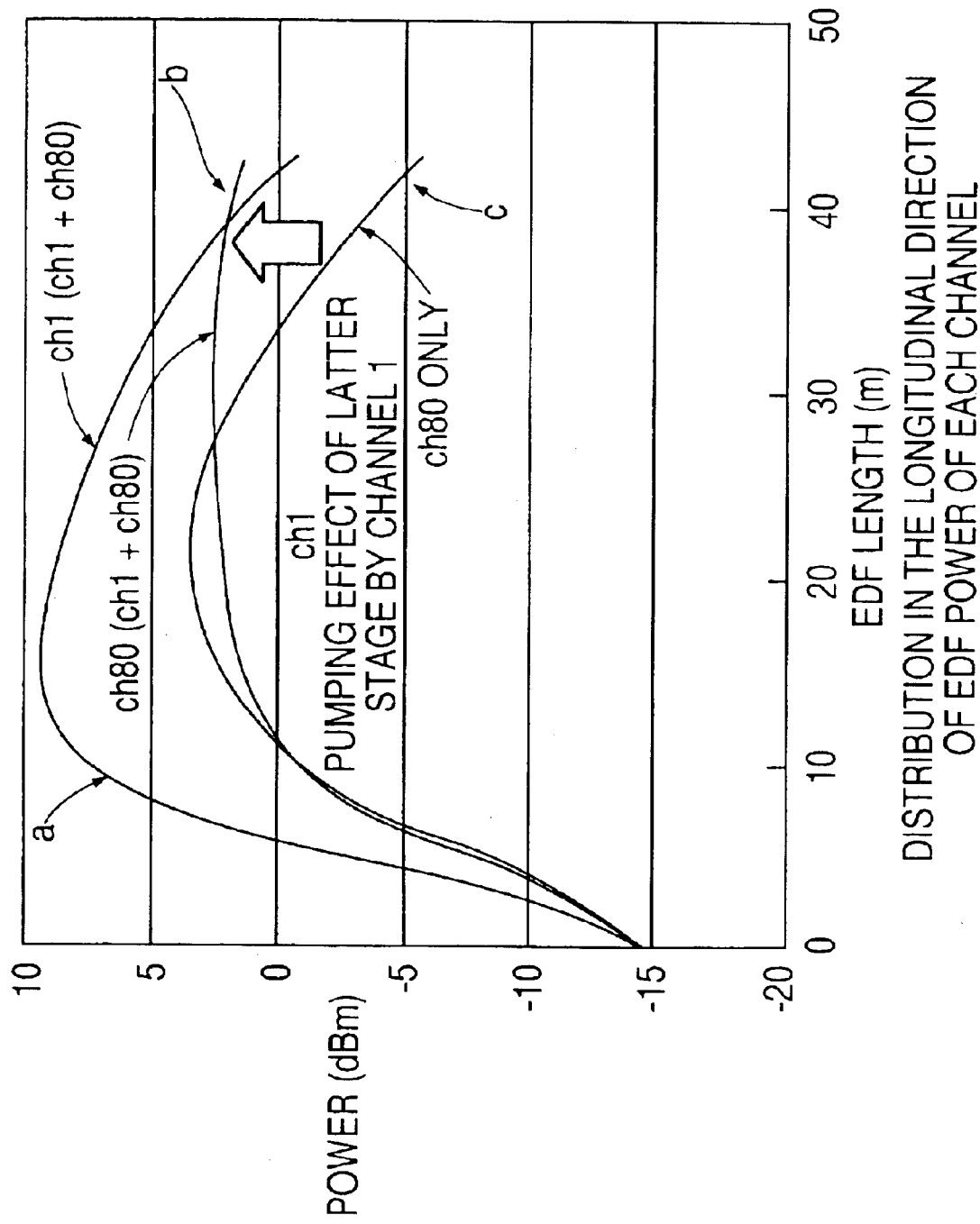
FIG. 7 is a graph illustrating the distribution in the longitudinal direction of power of each channel in the EDF.

As a practical example, FIG. 7 illustrates the power distribution in the longitudinal direction of an EDF of channel 1 in the short wavelength side and channel 80 in the long-wavelength side, as an example for the arbitrary desired wavelength light among the signal light of 80 channels provided in FIG. 4 is multiplexed by the wavelength multiplexing method. In FIG. 7, when the pumping power is kept constant with a forward pumping for the signal light through an EDF, the curve "a" indicates the light power output of the signal light of channel 1 when the signal light of channel 1 and the signal light of channel 80 are multiplexed and amplified, while the curve "b" indicates the output light power of the signal light of channel 80 when the signal light of channel 1 and signal light of channel 80 are amplified optically. Finally, the curve "c" indicates the output characteristic of the signal light of channel 80 when only the signal light of channel 80 is amplified optically.

As illustrated in the figure, when only the signal light of channel 80 is amplified, the signal light of channel 80 is considerably attenuated at the output of the EDF. However, when two signal lights are amplified the same pumping light power, as the former case it can be observed that the power of the signal light of channel 80 is pumped with the power absorption by GSA of the signal light of channel 1. Namely, it is observed that the gain of channel 80 is larger than that for amplification of only one signal light channel when two wavelengths (total input power is higher than of the single wavelength) are amplified under the same pumping light power condition. Due to this observed phenomenon, it can be said that even when, for example, the feedback control is executed to the pumping light to make the gain and output level constant, if the signal light of channel 1 is removed during amplification of the signal light of channels 1 and 80, the output signal light of channel 80 is transitionally lowered to a large extent and a momentary error is generated in the signal light of channel 80 at the receiver of the transmission system.

Moreover, this phenomenon may be thought to occur not only in the case of using the Er-doped fiber optical amplifier for the L-band, but also in the case where a comparatively long-length fiber, such as a Tm-doped fluoride fiber optical amplifier, having a lower inversion population ratio and obtaining the gain with longer fiber length (gain shift mechanism similar to E-DFA), is used.

Three solutions are provided to solve the problems caused by this phenomena. First, to avoid the long-length of amplifying medium, the amplifying medium should be divided in the longitudinal direction to supply the pumping light to respective media. Second, since the amplifying bandwidth is wide, enough to cause above power variation due to the fact that the bandwidth in the short wavelength side is used for the pumping light for the bandwidth in the long-wavelength side the bandwidth should be divided and the length of the amplifying media is optimized for respective divided bandwidths to supply the pumping light. Third, the pumping light should be simultaneously supplied to the area near output of amplifying medium to prevent transit defect of of output power level.

Figure 8:
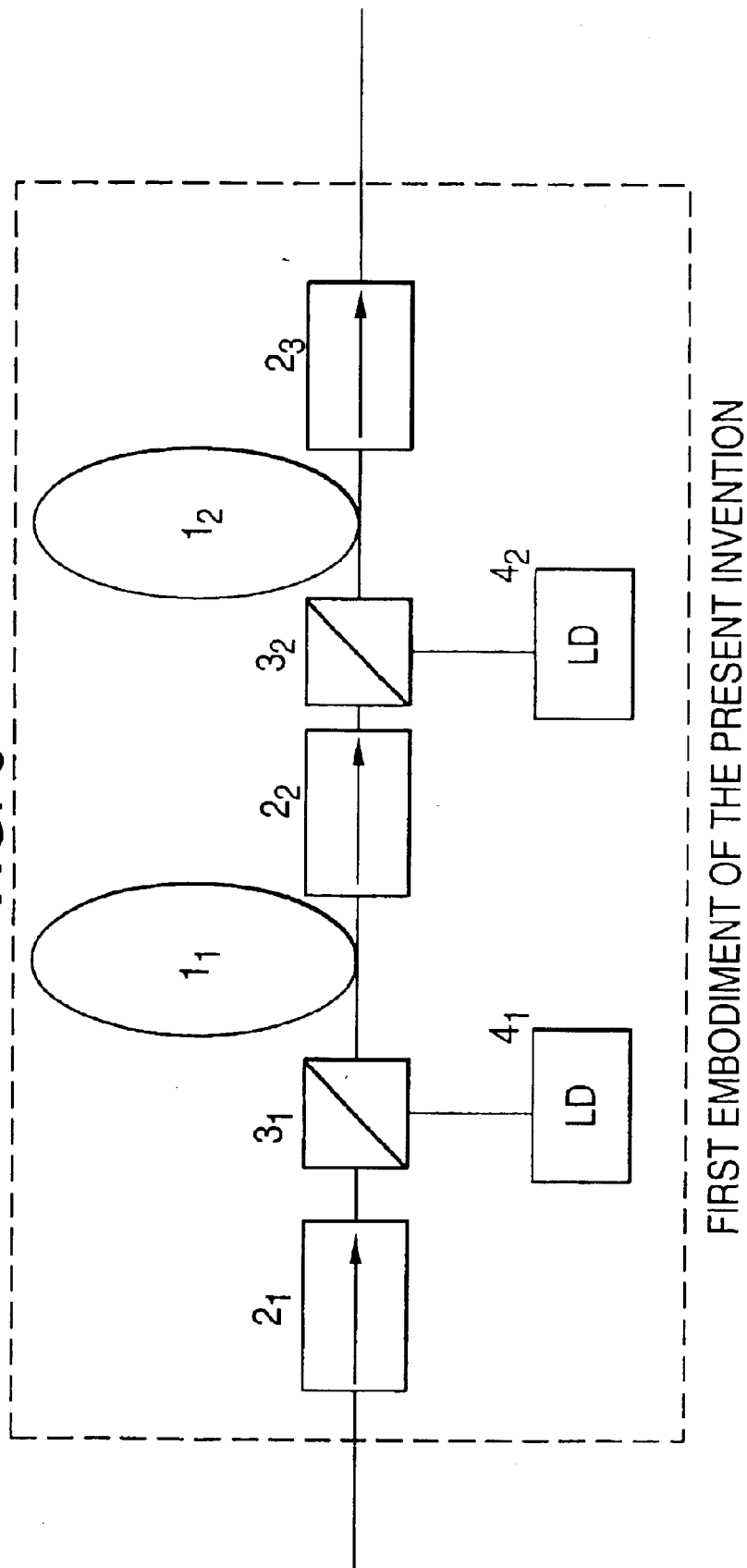
FIG. 8 is a diagram illustrating a structure of an amplifier within a unit according to an embodiment of the present invention.

FIG. 8 illustrates a first embodiment of the apparatus of the present invention, which includes EDFs $1_1$ and $1_2$, isolators $2_1, 2_2$ and $2_3$, WDM couplers $3_1$, and $3_2$ combining the pumping light and the signal light, and pumping lasers $4_1, 4_2$.

As illustrated in FIG. 8, the gain is divided by EDF $1_1$, and EDF $1_2$ and the lights are inputted via the WDM couplers $3_1$ and $3_2$ with the respective pumping lights $4_1$ and $4_2$ such that the main signal light passing through the path including the optical isolator $2_1$, the WDM coupler $3_1$, the EDF $1_1$, the optical isolator $2_2$, the WDM coupler $3_2$, the EDF $1_2$ and optical isolator $2_3$ is amplified with each divided optical amplifiers.

Figure 9:
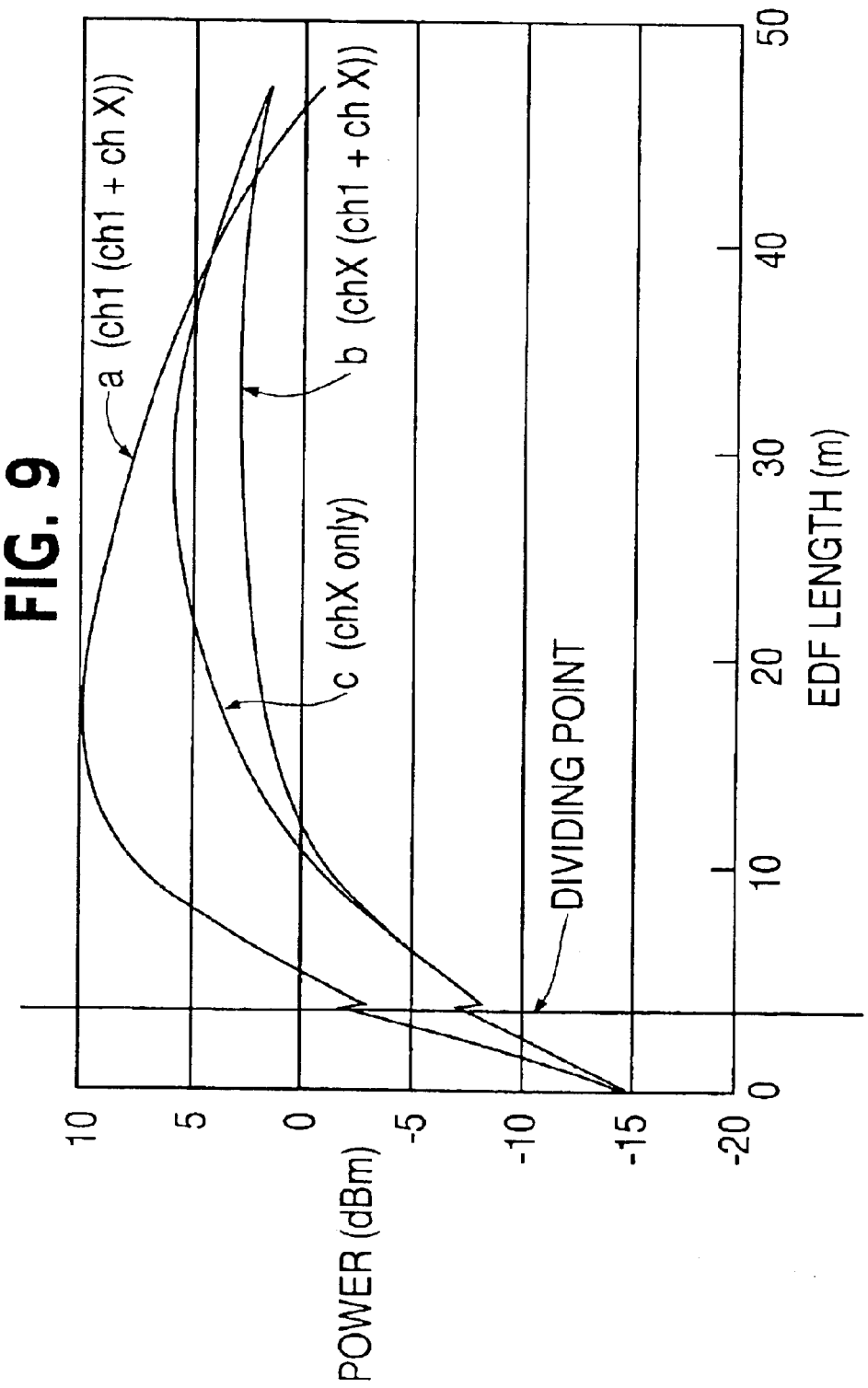
FIG. 9 is a graph illustrating the power distribution in the longitudinal direction of EDF length in an embodiment of the present invention.

The power distribution of each channel of the long wavelength side when two-wavelength lights are injected to the structure of FIG. 8 is illustrated in FIG. 9. Referring to FIG. 9, the power distribution output in the longitudinal direction is illustrated wherein the dividing point is set to 4 m point (thus the first rare earth element being 4 m long and the second rare earth element fiber being 43 m long), and the short wavelength light of channel 1 is set to 1570 nm, while the long wavelength light of a channel X is set to 1600 nm.

The curve "a" illustrates the output power distribution of the signal light of channel 1 when the signal light of channel 1 and the signal light of channel X are amplified together, while the curve "b" illustrates the output power distribution of the signal light of channel X when the signal light of channel 1 and the signal light of channel X are amplified together. Finally, the curve "c" illustrates the output power distribution of the signal light of channel X when only the signal light of channel X is amplified. The pumping light condition for measuring the characteristics of "a" and "b" is identical to that of the pumping laser for measuring the characteristic of "c" (the wavelength of pumping laser $4_1$ is 980 nm and the injected power is 100 mW, while the wavelength of the pumping laser $4_2$ is 1460 nm and the injected power is 42 mW).

When the power output level of channel X at the output of EDF is compared in the cases where only the signal light of channel X is inputted of FIG. 9, and the case where only the signal light of channel 80 is inputted on FIG.7, variation of the output of the signal light channel in the long wavelength side becomes zero, which means an power defect output drop is not observed in FIG.9.

Further in FIG. 9, a loss observed in the EDF dividing point (4 m) is an insertion loss of the optical isolator $2_2$ and WDM coupler $3_2$ inserted at the dividing point. The dividing point position can be obtained, as an example, by following the graph provided in FIG. 5.

Following the graph of FIG. 5, the length of $EDF1_1$ is set to the region (hatched region) where the output power variation is positive, which means the output power of two wavelengths amplification is compared with the output power in case of only one wavelength amplification. Further, the subsequent $EDF1_2$ can prevent drop of the inversion population ratio at the area near the output of the EDF which case drop of the output level by pumping the light with the second pumping light source $4_2$ to cover the shortage of pumping light near the output of EDF.

Alternatively, under the condition explained above, since the residual optical power at the output of the EDIF of the light power of the forward pumping is about 20 mW or higher, it is also possible to set the dividing point between the EDFs at the point where the residual power at the output of EDF is maintained at a power higher than 20 mW. Moreover, it is also possible to amplify the light by dividing the amplifying step into three or more steps as required.

Figure 10:
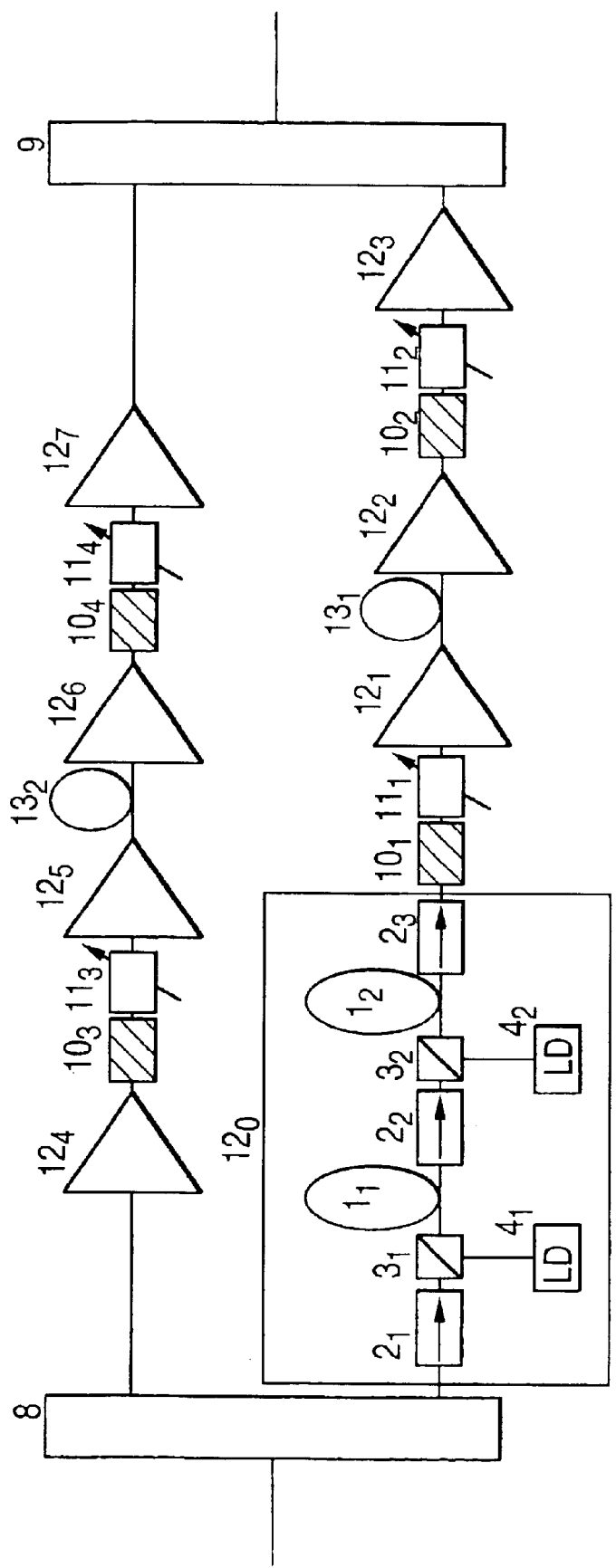
FIG. 10 is a diagram illustrating multiple stage amplifier units according to an embodiment of the present invention.

FIG. 10 illustrates another embodiment of the present invention. This embodiment is the practical structural example of the case where the previous embodiment is used in a system for actually amplifying the lights in the C-band and L-band. FIG. 10 includes EDFs $1_1$ and $1_2$; optical isolators $2_1$, $2_2$, and $2_3$, WDM couplers $3_1$, and $3_2$, to combine the pumping light and signal light, pumping lasers $4_1$, and $4_2$, a branching coupler 8 to branch the C-band and L-band bandwidths to different outputs, respectively, a combining coupler 9 to combine the C-band and L-band bandwidths, gain equalizing filters $10_1$, $10_2$, $10_3$, and $10_4$, variable optical attenuators $11_1$, $11_2$, $11_3$, and $11_4$, optical amplifiers $12_0$, $12_1$, $12_2$, $12_3$, $12_4$, $12_5$, $12_6$, and $12_7$, and dispersion compensators $13_1$, and $13_2$.

As illustrated in FIG. 10, the wavelength multiplexed C-band signal light is isolated from the L-band bandwidth with a branching coupler 8. The C-band signal light branched with the branching coupler 8 is then amplified with the optical amplifier $12_4$. The C-band signal light amplified with the optical amplifier $12_4$ is then gain-equalized with a gain equalizing filter $10_3$. This gain equalization is executed to compensate the loss characteristic in the transmission line of the preceding stage and gain difference generated between the amplifying bandwidths generated with optical amplifiers. An output of the gain equalizing filter $10_3$ is then inputted to a variable optical attenuator $11_3$ for attenuation at a predetermined amount.

The optical amplifier $12_4$ is always set under the automatic gain control (AGC) to control the gain to a constant value in the amplifying wavelength band. Therefore, an output value varies depending on variation of the input level. Moreover, the variable optical attenuator $11_3$ executes the automatic level control (ALC) to set the output value of the optical amplifier $12_4$ to the constant value. Next, the optical amplifier $12_5$ executes the AGC control similar to the optical amplifier $12_4$ to amplify the light of the C-band. An output of the optical amplifier $12_5$ is inputted to a dispersion compensator $13_2$ to compensate the dispersed value corresponding to the predetermined C-band the optical output of the dispersion compensator $13_2$ is then amplified through the optical amplifier $12_6$ and gain equalizing filter $10_4$, variable optical attenuator $11_4$ and optical amplifier $12_7$.

The practical function of the optical amplifier $12_6$ and gain equalizing filter $10_4$, variable optical attenuator $11_4$ and optical amplifier $12_7$ is identical to that of the preceding optical amplifier $12_4$, gain equalizing filter $10_3$, variable optical attenuator $11_3$ and optical amplifier $12_5$. Here, two stages of the identical structure are combined via the dispersion compensator $13_2$ in view of absorbing variation of the input dynamic range from the branching coupler 8 with the variable optical attenuator $11_3$ of the first stage, and moreover compensating the variation which cannot be absorbed with the optical amplifier $12_5$ in addition to the variation of the dispersion compensator $13_2$ with the optical amplifiers $12_6$ to $12_7$ in the variable optical attenuator $11_4$ in the second stage.

An output of the optical amplifier $12_7$ is wavelength multiplexed with the light of the L-band passing through the combining coupler 9 and is then outputted to the transmission path. On the other hand, the L-band signal light is also isolated to the L-band light and is then outputted after it is amplified via the optical amplifier $12_0$, gain equalizing filter $10_1$, variable optical attenuator $11_1$, optical amplifier $12_1$, dispersion compensator $13_1$, optical amplifier $12_2$, gain equalizing filter $10_2$, variable optical attenuator $11_2$ and optical amplifier $12_3$. The function of each structure of optical amplifiers from $12_0$ to $12_3$ is identical to that of the optical amplifiers from $12_4$ to $12_7$, but the structures of the optical amplifiers $12_0$, $12_1$, $12_2$ and $12_3$ are identical to that of the first embodiment of FIG. 8 and are formed of the elements having the characteristics identical to that illustrated in FIG. 9.

Figure 11:
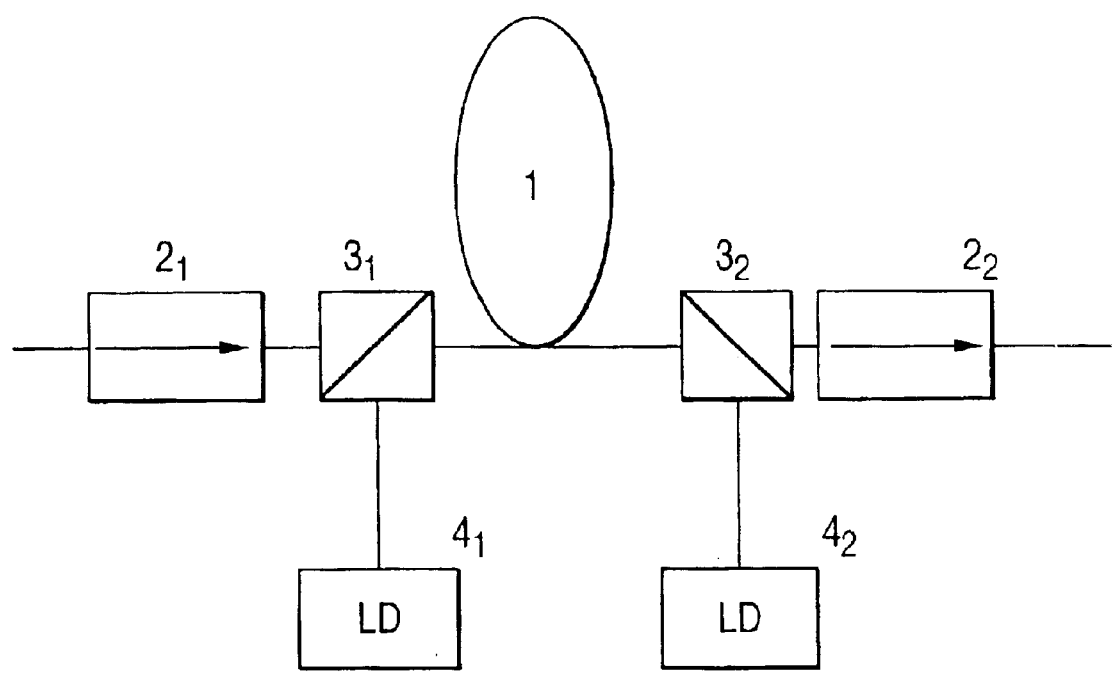
FIG. 11 is a diagram illustrating a structure of an amplifier unit with bi-directional pumping according to another embodiment of the present invention.

FIG. 11 illustrates another embodiment of the present invention. Referring to FIG. 11, reference numerals $1_1$, and $1_2$ designate EDF, reference numerals $2_1$, and $2_2$, designate optical isolators, reference numerals $3_1$, and $3_2$, designate WDM couplers combining the pumping light and signal light and reference numerals $4_1$, and $4_2$, designate pumping lasers. As illustrated in FIG. 11, a gain medium $EDF1_1$ receives the transmission signal light via the WDM coupler $3_1$ together with the forward pumping light $4_1$ and via the WDM coupler $3_2$ with the backward pumping light $4_2$. The main signal light is thus amplified through the path passing the optical isolator $2_1$, the WDM coupler $3_1$, the EDF $1_1$, the WDM coupler $3_2$ and the optical isolator $2_2$.

The pumping light of the laser $4_1$ pumping light is formed by combining the lights propagated in the same direction as the main signal light, and the pumping light of the laser $4_2$ pumping light is formed by combining the lights propagated in the inverse direction to the main signal light. Namely, in the embodiment, bi-directional pumping structure is employed. In this structure, the inversion population ratio and gain at the area near the output of the EDF rise, and output drop in case of the amplification of only the long wavelength light compared with the case of two wave length amplification can be prevented by injecting the forward pumping light and backward pumping light even from the case where only one wavelength signal light is used.

Figure 12:
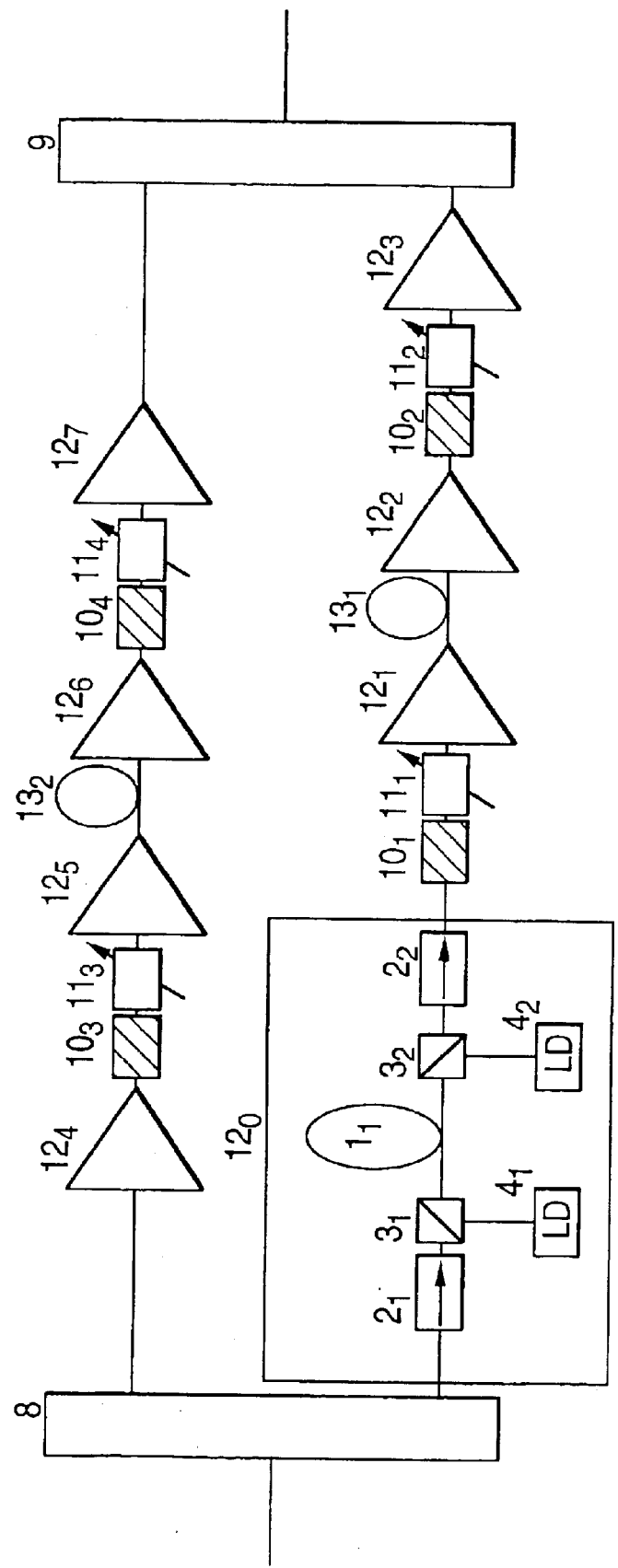
FIG. 12 is a diagram illustrating multiple stage amplifier units according to yet another embodiment of the present invention.

FIG. 12 illustrates another embodiment of the present invention, which includes EDF $1_1$, optical isolators $2_1$, $2_2$, and $2_3$, WDM couplers $3_1$ and $3_2$ to combine the pumping light and signal light, pumping lasers $4_1$ and $4_2$, a branching coupler 8 to branch the C-band and L-band to different output ports, a combining coupler 9 to combine the C-band and L-band, gain equalizing filters $10_1$, $10_2$, $10_3$, and $10_4$, variable optical attenuators $11_1$, $11_2$, $11_3$, and $11_4$, optical amplifiers $12_{0,\ 121}$, $12_2$, $12_3$, $12_4$, $12_5$, $12_6$, and $12_7$, and dispersion compensators $13_1$ and $13_2$.

As illustrated in FIG. 12, the C-band signal light is amplified and outputted after passing through the route of the branching coupler 8, the optical amplifier $12_4$, the gain equalizing filter $10_3$, the variable optical attenuator $11_3$, the optical amplifier $12_5$, the dispersion compensator $13_2$, the optical amplifier $12_6$, the gain equalizing filter $10_4$, the variable optical attenuator $11_4$, optical amplifier $12_7$ and the combining coupler 9. Meanwhile, the L-band signal light is amplified and outputted after passing the route of the branching coupler 8, the optical isolator $2_1$, the WDM coupler $3_1$, the $EFF1_1$, the WDM coupler $3_2$, the optical isolator $2_2$, the gain equalizing filter $10_1$, the variable optical attenuator $11_1$, the optical amplifier $12_1$, the dispersion compensator $13_1$, the optical amplifier $12_2$, the gain equalizing filter $10_2$, the variable optical attenuator $11_2$ and the optical amplifier $12_3$. Functions and operations of each structure illustrated in FIG. 12 are substantially identical to that in FIG. 10. However, a difference between these figures is that the optical amplifiers $12_0$, $12_1$, $12_2$ and $12_3$ employ the bi-directional pumping structure as in the case of FIG. 11.

Figure 13:
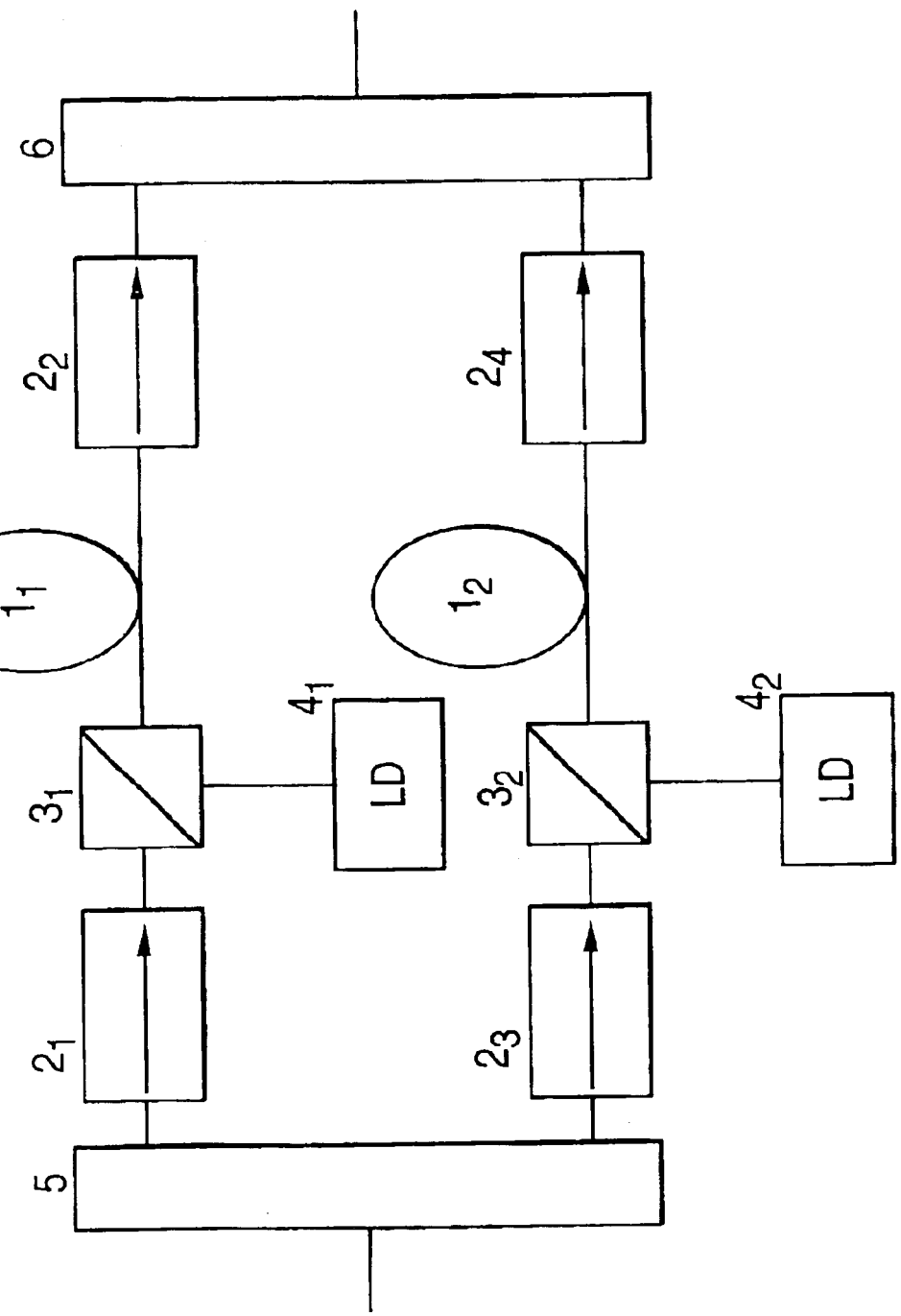
FIG. 13 is a diagram illustrating yet another embodiment of the present invention.

FIG. 13 illustrates another embodiment of the present invention, which includes Er-doped fibers $1_1$, and $1_2$, optical isolators $2_1$, $2_2$, $2_3$, and $2_4$, WDM couplers $3_1$, and $3_2$, to combine the pumping light and signal light, pumping lasers $4_1$ and $4_2$, a bandwidth branching coupler 8 and a bandwidth combining coupler 9.

As illustrated in FIG. 13, the main signal light is divided for each gain bandwidth with the bandwidth branching coupler 5. Each main transmission signal light is then inputted to the $EDF1_1$ or $EDF1_2$ together with respective pumping lights $4_1$, $4_2$ via the WDM couplers $3_1$ and $3_2$. The main signal lights respectively pass through the route of the bandwidth branching coupler 5, the optical isolator $2_1$, the WDM coupler $3_1$, the Er-doped fiber $1_1$, the optical isolator $2_2$ and the bandwidth combining coupler 6 and the route of the bandwidth branching coupler 5, the optical isolator $2_3$, the WDM coupler $3_2$, the Er-doped fiber $1_2$ and the optical isolator $2_4$ and the bandwidth combining coupler 6.

With the structure provided above, for example, when two wavelengths of the short wavelength light (1570 nm) and long wavelength light (1600 nm) are inputted and amplified, this embodiment divides and amplifies both wavelength bands respectively by each EDF ($EDF1_1$, and $EDF1_2$) have optimum length of amplified wavelength band, namely, the short wavelength has large absorption at an end of the output so that the short wavelength is inputted to a short length of $EDF1_1$, and the long wavelength increases the absorption quickly so that the long wavelength is inputted to a long length of $EDF1_2$. Therefore, this embodiment realizes that GSA of short wavelength side can be no more significant at near the output of EDF and amplifying signal light will be less affected by another signal light. As a result, this embodiment decrease interaction between signal lights affect in both wavelength bands.

Figure 14:
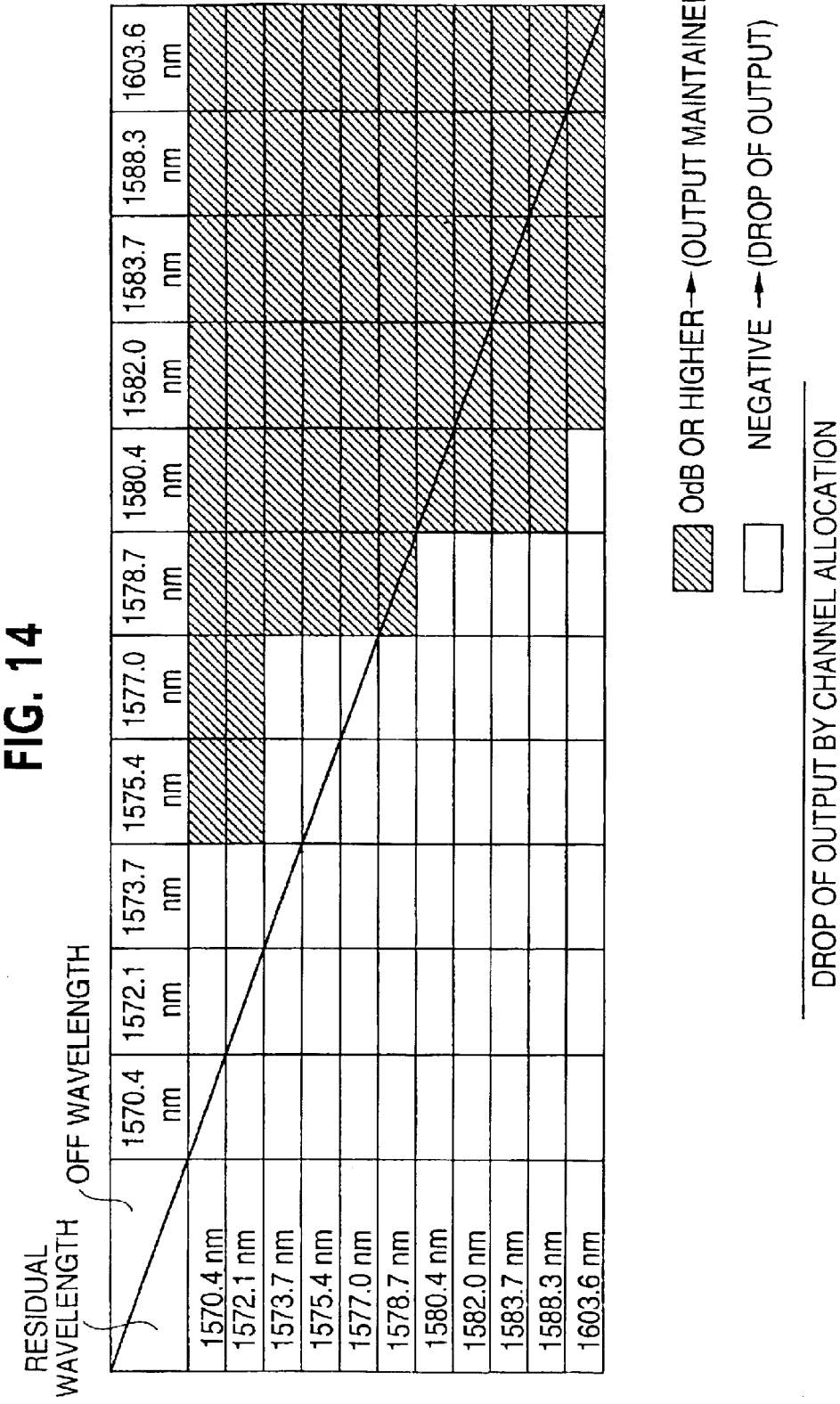
FIG. 14 is a table illustrating the drop of output level depending on the channel allocation.

Referring to FIG. 14, data giving the bandwidth dividing point is provided in a table indicating the decrease of output for combinations of wavelengths. Namely, since decrease of output is never generated when the short wavelength to be removed is 1582 nm or longer wave length, a method of dividing into the two bandwidths at the wavelength near this wavelength can be very effective. It is also possible to consider a method to amplify the light through division of a bandwidth into three or more bandwidths, as required.

Figure 15:
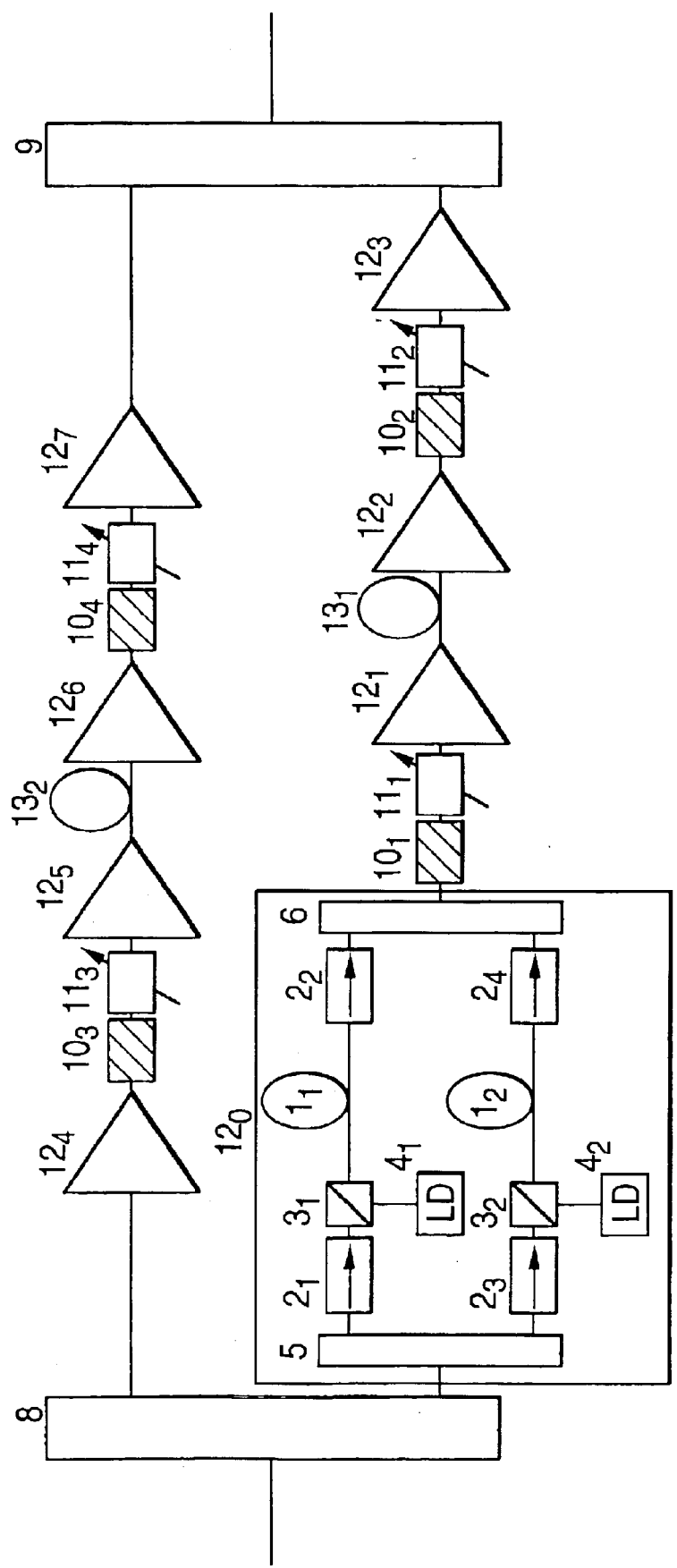
FIG. 15 is a diagram illustrating multiple stage amplifier units according to yet another embodiment of the present invention.

FIG. 15 illustrates another embodiment of the present invention, which includes EDFs $1_1$ and $1_2$, optical isolators $2_1$, $2_2$, $2_3$ and $2_4$, WDM couplers $3_1$ and $3_2$ to combine the pumping light and signal light, pumping lasers $4_1$ and $4_2$, a branching coupler 8 to respectively branch the C-band and L-band bandwidths to different output ports, a combining coupler 9 to combine the C-band and L-band bandwidths, gain equalizing filters $10_{1, 102, 103}$ and $10_4$, variable optical attenuators $11_{1, 112}$, $11_3$ and $11_4$, optical amplifiers $12_0$, $12_1$, $12_2$, $12_3$, $12_4$, $12_5$, $12_6$ and $12_7$, and dispersion compensators $13_1$ and $13_2$.

As illustrated in FIG. 15, the C-band transmission signal light is amplified and outputted by passing through the branching coupler 8, the optical amplifier $12_4$, the gain equalizing filter $10_3$, the variable optical attenuator $11_3$, the optical amplifier $12_5$, the dispersion compensator $13_2$, the optical amplifier $12_6$, the gain equalizing filter $10_4$, the variable optical attenuator $11_4$, the optical amplifier $12_7$ and the combining coupler 9.

Meanwhile, also in FIG. 15, the L-band light is amplified and outputted by passing through the branching coupler 8, the bandwidth branching coupler 5 branching the light into two bandwidths, one bandwidth branch of which passes through the optical isolator $2_1$, the WDM coupler $3_1$, the Er-doped fiber $1_1$, the optical isolator $2_2$ and the bandwidth combining coupler 6. Additionally, the second bandwidth branch of the L-band light is amplified and outputted by passing through, after exiting the bandwidth branching coupler 5, the optical isolator $2_3$, the WDM coupler $3_2$, the Er-doped fiber $1_2$, the optical isolator $2_4$ and the bandwidth combining coupler 6. Once the two bandwidth branches are combined by coupler 6, they pass through the gain equalizing filter $10_1$, the variable optical attenuator $11_1$, the optical amplifier $12_1$, the dispersion compensator $13_1$, the optical amplifier $12_2$, the gain equalizing filter $10_2$, the variable optical attenuator $11_2$ and the optical amplifier $12_3$.

Functions and operations of each structure illustrated in FIG. 15 are substantially identical to that in FIG. 10. However, a difference between the two systems is that the optical amplifiers $12_0$, $12_1$, $12_2$, and $12_3$ employ, as in the case of FIG. 13, the structure to divide the bandwidths to be used in order to lower the effect for amplifying the other signal light with the light in the short wavelength side used as the pumping light. Alternatively, it is also possible to introduce the structure integrating the branching coupler 8 and bandwidth branching coupler 5 within the optical amplifier $12_0$. Furthermore, in this structure, it is also possible to introduce the structure integrating the bandwidth combining coupler 6 within the optical amplifier $12_3$ and the combining coupler 9.

In addition, the bandwidth combining coupler 6 of the optical amplifier $12_0$, optical amplifier $12_1$, bandwidth combining coupler 6 of the optical amplifier $12_2$, bandwidth branching coupler 5 and bandwidth branching coupler 5 of the optical amplifier $12_3$ may be eliminated by perfectly dividing, within the L-band amplifier, the gain equalizers $10_1$, $10_2$, variable optical attenuators $11_1$, $11_2$ and dispersion compensator 13, for the two bandwidths.

Figure 16:
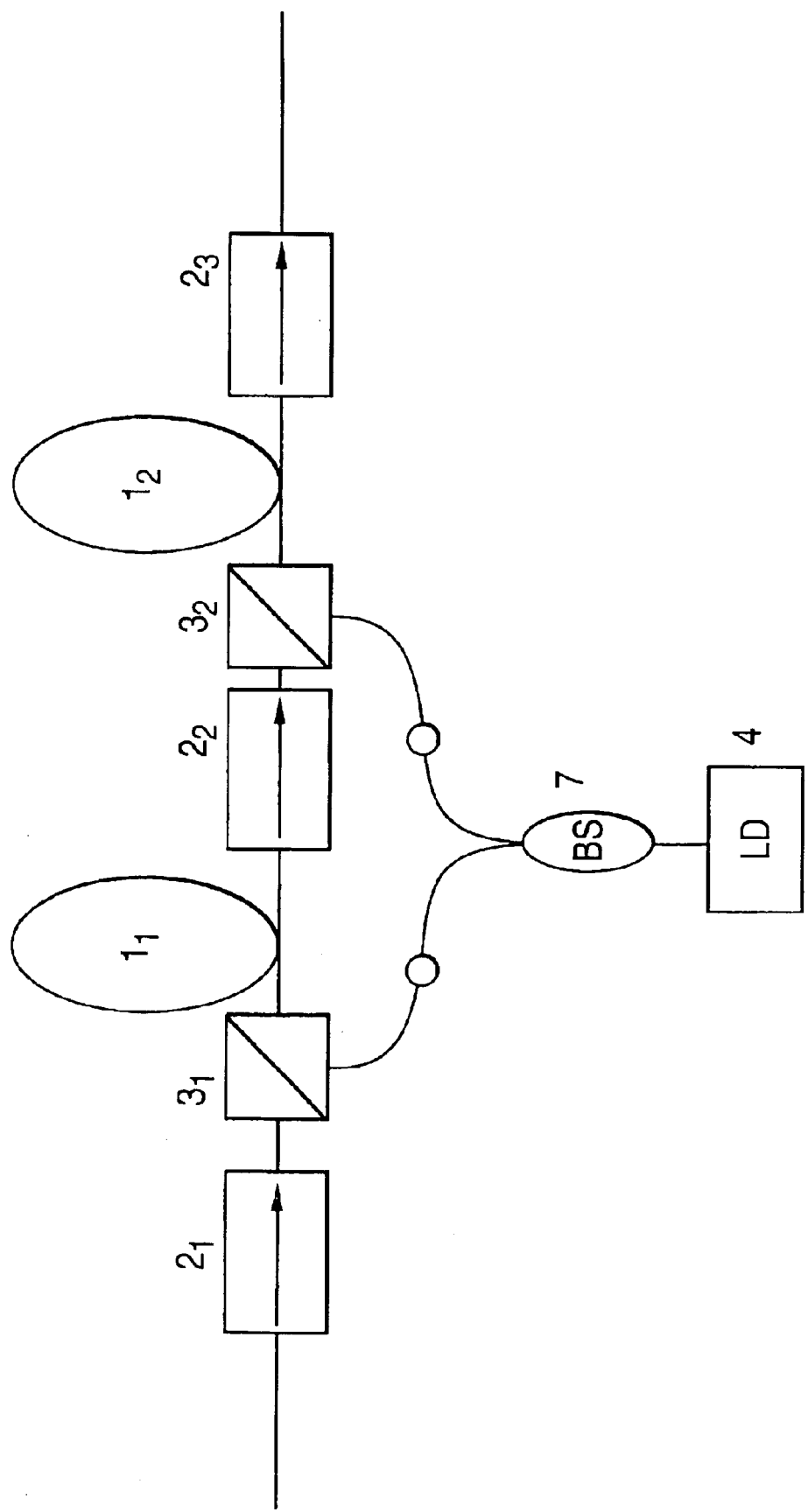
FIG. 16 is a diagram illustrating an amplifier unit splitting pumping light according to yet another embodiment of the present invention.

FIG. 16 illustrates another embodiment of the present invention, which includes this figure, the gain is divided as indicated at $EDF1_1$ and $EDF1_2$, the pumping light 4 is branched with the pumping light branching coupler 7, where both branches are then respectively inputted to the transmission path via the WDM couplers $3_1$ and $3_2$, and thereby the main signal light passing the route of the optical isolator $2_1$, the WDM coupler $3_1$, the EDF $1_1$, the optical isolator $2_2$, the WDM coupler $3_2$, the EDF $1_2$, and the optical isolator $2_3$ is amplified in the divided steps.

With the structure explained above, like the embodiment of FIG. 8, two wavelengths, for example, one of the short wavelength light (1570 nm) and one of the long wavelength light (1500 nm) are inputted and amplified. Under the same condition as above, when only one wavelength light is inputted, it is possible to expect the result that variation of the long wavelength light is set to zero at the output of the EDF, namely drop of output level can be reduced to zero in comparison with the characteristic (FIG. 7) in the existing structure by comparing the power output level at the output of the EDF.

Regarding the position of the dividing point, as in the case of the embodiment of FIG. 8, it may be set within the region of the EDF length where output variation becomes a positive value. Alternatively, there is provided a method for setting the dividing point to the point where the residual power at the output of the EDF of the forward pumping optical power does not become lower than a predetermined value, for example, about 20 mW.

The structure explained above results in the effect that the power branching ratio of the $EDF1_1$ and $EDF1_2$ can be maintained with this pumping light branching coupler 7, in addition to the effect that the number of pumping lasers can be reduced by branching the pumping light emitted from the single laser 4 with the pumping light branching coupler 7. This pumping structure of using a common pumping laser may also be used in the case of bi-directional pumping, as illustrated in FIG. 11.

Figure 17:
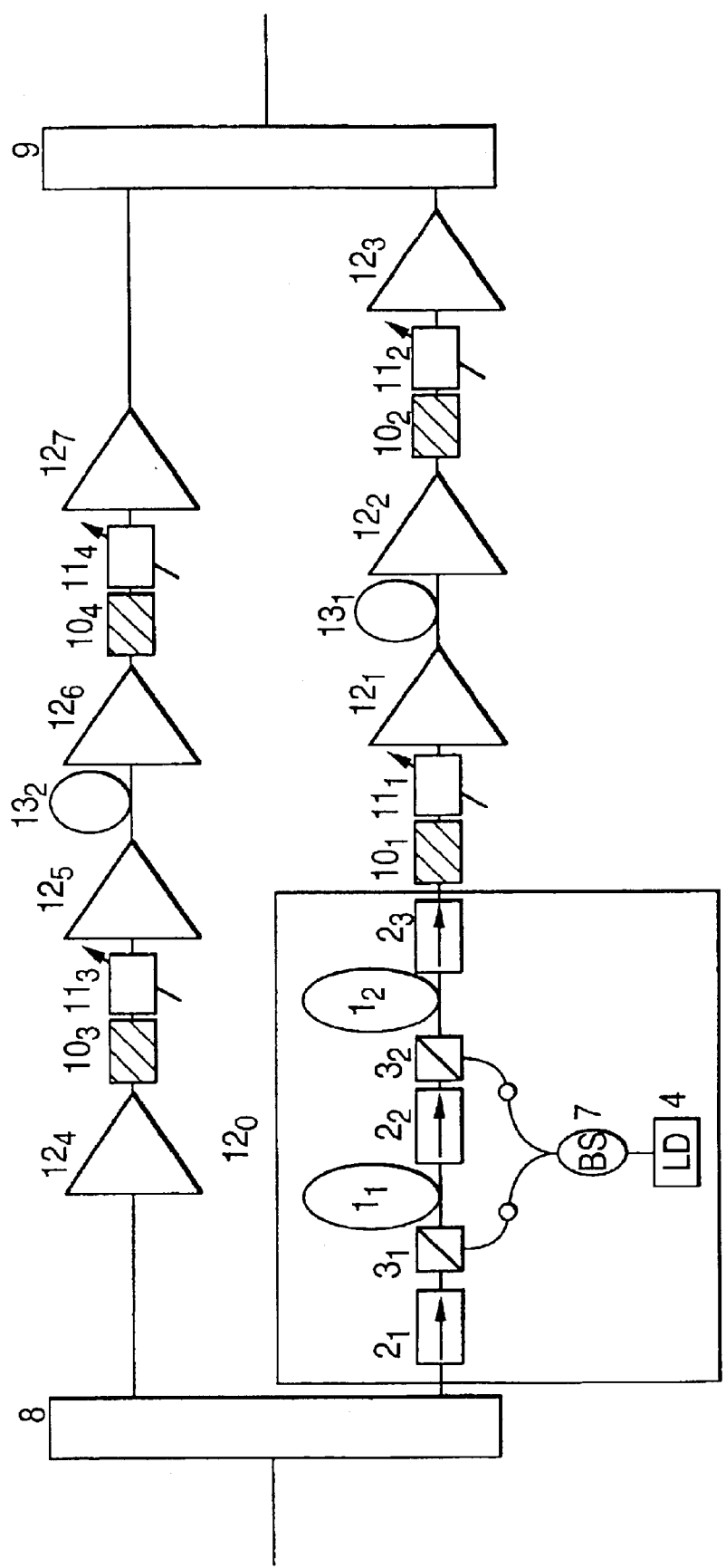
FIG. 17 is a diagram illustrating an amplifier unit of FIG. 16 among multiple stage amplifiers according to yet another embodiment of the present invention.

FIG. 17 illustrates yet another embodiment of the present invention, which includes EDFs $1_1$ and $1_2$, optical isolators $2_1$, $2_2$, and $2_3$, WDM couplers $3_1$ and $3_2$ to combine the pumping light and transmission signal light, pumping lasers $4_1$ and $4_2$, a branching coupler 8 to branch the C-band and L-band bandwidths to different output ports, a combining coupler 9 to combine the C-band and L-band bandwidths, gain equalizing filters $10_1$, $10_2$, $10_3$, and $10_4$, variable optical attenuators $11_1$, $11_2$, $11_3$, and $11_4$, optical amplifiers $12_0$, $12_1$, $12_2$, $12_3$, $12_4$, $12_5$, $12_6$, and $12_7$, and dispersion compensators $13_1$ and $13_2$.

As illustrated in FIG. 17, the C-band light is amplified and outputted by passing through the branching coupler 8, the optical amplifier $12_4$, the gain equalizing filter $10_3$, the variable optical attenuator $11_3$, the optical amplifier $12_5$, the dispersion compensator $13_2$, the optical amplifier $12_6$, the gain equalizing filter $10_4$, the variable optical attenuator $11_4$, the optical amplifier $12_7$ and combining coupler 9.

Meanwhile, also in FIG. 17, the L-band light is amplified and outputted by passing through the branching coupler 8, the optical isolator $2_1$, the WDM coupler $3_1$, the EDF11, the optical isolator $2_2$, the WDM coupler $3_2$, the $EDF1_2$, optical isolator $2_3$, gain equalizing filter $10_1$, variable optical attenuator $11_1$, optical amplifier $12_1$, the dispersion compensator $13_1$, the optical amplifier $12_2$, the gain equalizing filter $10_2$, the variable optical attenuator $11_2$, the optical amplifier $12_3$ and the combining coupler 9.

Functions and operations of each structure illustrated in FIG. 17 are substantially identical to that in FIG. 10. However, a difference between these systems is that the optical amplifiers $12_0$, $12_1$, $12_2$, and $12_3$ use in common the same pumping light source, as provided in FIG. 16.

As illustrated in FIG. 16 and FIG. 17, it is also possible, in the embodiments of FIG. 10, 11 and 12, to supply the pumping lights to the EDF by branching the pumping light with a light splitter by using in common the pumping light source.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus comprising:
    a first optical amplifier comprising a first fiber doped with a rare earth element and provided with first pumping light so that signal light is amplified as the signal light travels through the first fiber, the amplified signal light being output from an output end of the first fiber; and
    a second optical amplifier comprising a second fiber doped with a rare earth element and positioned so that the signal light output from the output end of the first fiber travels through the second fiber, the second fiber being provided with second pumping light so that the signal light is amplified as the signal light travels through the second fiber, wherein
    the second pumping light is forward pumping light, and
    the first fiber has a length so that a value is positive at the output end of the first fiber, said value being a difference obtained by subtracting a light power at the output end of signal light at a first wavelength in the case where the signal light at the first wavelength and a signal light at a second wavelength are multiplexed together and transmitted through the first and second fibers while a power of the first and second pumping light is constant, from a light power at the output end of the signal light at the first wavelength while the first wavelength, but not the second wavelength, is transmitted through the first and second fibers.

2. An apparatus as in claim 1, wherein the signal light is a wavelength division multiplexed (WDM) signal light including a plurality of signal lights at different wavelengths multiplexed together, said first wavelength being a shortest multiplexed wavelength in the WDM signal light and said second wavelength being a longest multiplexed wavelength in the WDM signal light.

3. An apparatus as in claim 1, further comprising:
    an enclosure enclosing both the first and second optical amplifiers.

4. An apparatus as in claim 2, further comprising:
    an enclosure enclosing both the first and second optical amplifiers.

5. An apparatus for amplifying a wavelength division multiplexed (WDM) signal light including a plurality of signal lights at different wavelengths multiplexed together and over first and second wavelength bands, the apparatus comprising:
    a divider dividing the WDM signal light into a first light including the signal lights in the first wavelength band and a second light include the signal lights in the second wavelength band; and
    first and second amplifiers amplifying the first and second lights, respectively, wherein the first amplifier comprises
        a first optical amplifier comprising a first fiber doped with a rare earth element and provided with first pumping light so that the first light is amplified as the first light travels through the first fiber, the amplified first light being output from a output end of the first fiber, and
        a second optical amplifier comprising a second fiber doped with a rare earth element and positioned so that the first light output from the output end of the first fiber travels through the second fiber, the second fiber being provided with second pumping light so that the first light is amplified as the first light travels through the second fiber, wherein
            the second pumping light is forward pumping light, and the first fiber has a length so that a value is positive at the output end of the first fiber, said value being a difference obtained by subtracting a light power at the output end of signal light at a first wavelength in the first light in the case where the signal light at the first wavelength and a signal light at a second wavelength in the first light are transmitted through the first and second fibers while a power of the first pumping light is constant, from a light power at the output end of the signal light at the first wavelength while the signal light at the first wavelength, but not the signal light at the second wavelength, is transmitted through the first and second fibers.

6. An apparatus as in claim 5, wherein the first wavelength is a shortest multiplexed wavelength in the first light and the second wavelength is a longest multiplexed wavelength in the first light.

7. An apparatus as in claim 5, further comprising:
an enclosure enclosing both the first and second optical amplifiers.

8. An apparatus as in claim 6, further comprising:
an enclosure enclosing both the first and second optical amplifiers.

9. An apparatus for amplifying a wavelength division multiplexed (WDM) signal light including first and second signal lights at first and second wavelengths, respectively, multiplexed together, the apparatus comprising:
a first optical amplifier comprising a first fiber doped with a rare earth element and provided with first pumping light so that WDM signal light is amplified as the WDM signal light travels through the first fiber, to thereby output an amplified WDM signal light; and
a second optical amplifier comprising a second fiber doped with a rare earth element and positioned so that the WDM signal light output from the first optical amplifier travels through the second fiber, the second fiber being provided with second pumping light so that the WDM signal light is amplified as the WDM signal light travels through the second fiber,
wherein the first and second optical amplifiers operate together so that, when the signal light at the first wavelength is attenuated or disappears, a power of the signal light at the second wavelength at a output end of the second fiber is substantially equal to, or higher than, a power of the signal light at the second wavelength at the output end of the second fiber before the signal light at the first wavelength was attenuated or disappeared.

10. An apparatus as in claim 9, wherein the first wavelength is a shorter wavelength than the second wavelength.

11. An apparatus as in claim 9, wherein the first wavelength is a shortest multiplexed wavelength in the WDM signal light and the second wavelength is a longest multiplexed wavelength in the WDM signal light.

12. An apparatus as in claim 9, further comprising:
an enclosure enclosing both the first and second optical amplifiers.

13. An apparatus as in claim 11, further comprising:
an enclosure enclosing both the first and second optical amplifiers.

14. An apparatus for amplifying a wavelength division multiplexed (WDM) signal light including a plurality of signal lights at different wavelengths multiplexed together and over first and second wavelength bands, the apparatus comprising:
a divider dividing the WDM signal light into a first light including the signal lights in the first wavelength band and a second light include the signal lights in the second wavelength band; and
first and second amplifiers amplifying the first and second lights, respectively, wherein the first amplifier comprises
a first optical amplifier comprising a first fiber doped with a rare earth element and provided with first pumping light so that first light is amplified as the first light travels through the first fiber, to thereby output an amplified first light, and
a second optical amplifier comprising a second fiber doped with a rare earth element and positioned so that the first light output from the first optical amplifier travels through the second fiber, the second fiber being provided with second pumping light so that the first light is amplified as the first light travels through the second fiber,
wherein the first and second optical amplifiers operate together so that, when a signal light at a first wavelength in the first light is attenuated or disappears, a power of signal light at a second wavelength in the first light at a output end of the second fiber is substantially equal to, or higher than, a power of the signal light at the second wavelength at the output end of the second fiber before the signal light at the first wavelength was attenuated or disappeared.

15. An apparatus as in claim 14, wherein the first wavelength is a shortest multiplexed wavelength in the first light and the second wavelength is a longest multiplexed wavelength in the first light.

16. An apparatus as in claim 14, further comprising:
an enclosure enclosing both the first and second optical amplifiers.

17. An apparatus as in claim 15, further comprising:
an enclosure enclosing both the first and second optical amplifiers.

18. An optical amplifier comprising:
a first rare earth element doped fiber receiving a transmission input signal light having at least two wavelengths and amplifying said transmission input signal light with a first pumping light; and
a second rare earth element doped fiber amplifying an output of said first rare earth element doped fiber with a second pumping light;
wherein the output transmission signal light of a first wavelength is attenuated or disappears, and the output transmission signal power light of a second wavelength is approximately equal to or higher than said output transmission signal light power of said second wavelength before the transmission signal light of said first wavelength is attenuated or disappears.

19. An optical amplifier comprising:
a first rare earth element doped fiber receiving and amplifying a transmission input signal light having at least two wavelengths with a first pumping light; and
a second rare earth element doped fiber amplifying an output of said first rare earth element doped fiber with a second pumping light;
wherein the length of said first rare earth element doped fiber is set such that the output transmission signal light power of a first wavelength is attenuated or disappears, and the transmission signal light power of a second wavelength is approximately identical to or higher than said output transmission signal optical power of the second wavelength before the transmission signal light of the first wavelength is attenuated or disappears.

20. The optical amplifier according to claim 19, wherein the first pumping light and the second pumping light are branched from one pumping light source.

21. An optical amplifier comprising:
a wavelength band portion dividing an input transmission signal light into a plurality of wavelength bands; and
optical amplifiers associated with each respective wavelength band divided by said wavelength band portion, at least one optical amplifier of said amplifiers comprising a first rare earth element doped fiber receiving and amplifying a transmission input signal light with a first pumping light and a second rare earth element doped fiber amplifying an output of said first rare earth element doped fiber with a second pumping light;
wherein the length of said first rare earth element doped fiber is set such that the output transmission signal light power of a first wavelength is attenuated or disappears, and the transmission signal light power of a second wavelength is approximately identical to or higher than said output transmission signal optical power of the second wavelength before the transmission signal light of the first wavelength is attenuated or disappears.

22. A method of amplifying a wavelength multiplexed transmission signal light having at least two wavelengths through a first and second rare earth element doped fiber, said method comprising:
providing a first pumping light through the first rare earth element doped fiber together with the transmission signal input light; and
inputting an output of said first rare earth element doped fiber and a second pumping light to a second rare earth element doped fiber such that the transmission signal light of a first wavelength is attenuated or disappears, and the output transmission signal light power of a second wavelength is approximately identical to or higher than said output transmission signal light power of the second wavelength before said transmission signal light of the first wavelength is attenuated or disappears.

23. An apparatus comprising:
a first optical amplifier comprising a first fiber doped with a rare earth element and provided with first pumping light so that signal light is amplified as the signal light travels through the first fiber, the amplified signal light being output from an output end of the first fiber; and
a second optical amplifier comprising a second fiber doped with a rare earth element, the signal light output from the output end of the first fiber traveling through the second fiber, the second fiber being provided with second pumping light so that the signal light is amplified as the signal light travels through the second fiber,
wherein the first fiber has a length so that, at the output end, a power level at a predetermined wavelength in the signal light remains approximately constant when power levels of the first and second pumping lights are constant and a number of wavelength in the signal light changes.

24. An apparatus as in claim 23, wherein the signal light is a wavelength division multiplexed (WDM) signal light including a plurality of wavelength multiplexed together.

25. An apparatus as in claim 23, further comprising:
an enclosure enclosing both the first and second optical amplifiers.

26. An apparatus as in claim 24, further comprising:
an enclosure enclosing both the first and second optical amplifiers.

27. An optical amplifier comprising:
a demultiplexer dividing an input signal light into a plurality of wavelength bands;
a first optical amplifier comprising a first fiber doped with a rare earth element, the first optical amplifier amplifying one of the divided wavelength bands, said one of the divided wavelength bands including a signal light at a first wavelength and a signal light at a second wavelength which travel through the first fiber, the first fiber provided with first pump light so that the signal light at the first wavelength and the signal light at the second wavelength are amplified as the signal lights travel through the first fiber, the first optical amplifier thereby outputting the amplified signal light at the first wavelength and the amplified signal light at the second wavelength; and
a second optical amplifier comprising a second fiber doped with a rare earth element and positioned so that the amplified signal light at the first wavelength and the amplified signal light at the second wavelength output from first optical amplifier travel through the second fiber, the second fiber being provided with second pump light so that the signal light at the first wavelength and the signal light at the second wavelength are amplified as the signal lights travel through the second fiber,
wherein, when the signal light at the first wavelength is attenuated or disappears, a power of the signal light at the second wavelength at an output end of the second fiber is substantially equal to, or higher than, a power of the signal light at the second wavelength at the output end of the second fiber before the signal light at the first wavelength was attenuated or disappeared.

28. An optical amplifier comprising:
a demultiplexer dividing an input signal light into a plurality of wavelength bands;
a first optical amplifier amplifying one of the divided wavelength bands, said one of the divided wavelength bands including a signal light at a first wavelength and a signal light at a second wavelength, the first optical amplifier thereby outputting the amplified signal light at the first wavelength and the amplified signal light at the second wavelength; and
a second optical amplifier comprising a fiber doped with a rare earth element and positioned so that the amplified signal light at the first wavelength and the amplified signal light at the second wavelength output from first optical amplifier travel through the fiber, the fiber being provided with pump light so that the signal light at the first wavelength and the signal light at the second wavelength are amplified as the signal lights travel through the fiber,
wherein, when the signal light at the first wavelength is attenuated or disappears, a power of the signal light at the second wavelength at an output end of the fiber is substantially equal to, or higher than, a power of the signal light at the second wavelength at the output end of the fiber before the signal light at the first wavelength was attenuated or disappeared.

* * * * *